US010052947B2

(12) United States Patent
Herrmann et al.

(10) Patent No.: US 10,052,947 B2
(45) Date of Patent: Aug. 21, 2018

(54) CLOSURE DEVICE FOR A FILLING OR CONNECTION OPENING ON A VEHICLE

(71) Applicant: Brose Fahrzeugteile GmbH & Co. KG, Coburg, Coburg (DE)

(72) Inventors: Christian Herrmann, Coburg (DE); Hubert Panejko, Coburg (DE); Markus Bauernfeind, Coburg (DE); Maik Rienecker, Meiningen (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 6 days.

(21) Appl. No.: 15/116,177

(22) PCT Filed: Feb. 3, 2015

(86) PCT No.: PCT/EP2015/052128
§ 371 (c)(1),
(2) Date: Sep. 19, 2016

(87) PCT Pub. No.: WO2015/114154
PCT Pub. Date: Aug. 6, 2015

(65) Prior Publication Data
US 2017/0001517 A1 Jan. 5, 2017

(30) Foreign Application Priority Data

Feb. 3, 2014 (DE) .................. 10 2014 201 886
Mar. 17, 2014 (DE) .................. 10 2014 103 642

(51) Int. Cl.
*B60K 15/05* (2006.01)
*B60K 15/04* (2006.01)
(Continued)

(52) U.S. Cl.
CPC .............. *B60K 15/05* (2013.01); *E05F 15/70* (2015.01); *B60K 2015/0422* (2013.01);
(Continued)

(58) Field of Classification Search
CPC .............. B60K 15/05; B60K 2015/422; B60K 2015/0425; B60K 2015/0445;
(Continued)

(56) References Cited

U.S. PATENT DOCUMENTS 4,817,813 A   4/1989 Krause
4,886,182 A   12/1989 Fedelem et al.
(Continued)

FOREIGN PATENT DOCUMENTS

DE   3301072 A1   7/1984
DE   3637289 A1   5/1988
(Continued)

OTHER PUBLICATIONS

Japanese Office action dated Jul. 31, 2017 issued in corresponding Japanese Patent Application No. 2016-549770, 6 pages, with English translation, 5 pages.
(Continued)

*Primary Examiner* — Gregory A Blankenship
(74) *Attorney, Agent, or Firm* — Lewis Roca Rothgerber Christie LLP

(57) ABSTRACT

A closure device for closing a through opening on a vehicle is provided. An interior space with a filling or connection opening being accessible via the through opening, wherein the filling or connection opening is configured and provided for consumable filling on the vehicle, and it being possible for the through opening to be closed by way of a cover element which can be adjusted on the vehicle in a manner which is actuated by external force between at least one closure position for closing the through opening and an open position for opening the through opening. A control electronics system for triggering an adjustment of the cover element being provided with at least one first and second sensor device.

21 Claims, 24 Drawing Sheets

(51) Int. Cl.
*E05F 15/70* (2015.01)
*E05F 15/75* (2015.01)
*E05F 15/73* (2015.01)

(52) U.S. Cl.
CPC ............... *B60K 2015/0425* (2013.01); *B60K 2015/0445* (2013.01); *B60K 2015/0448* (2013.01); *B60K 2015/0454* (2013.01); *B60K 2015/053* (2013.01); *B60K 2015/0523* (2013.01); *B60K 2015/0538* (2013.01); *E05F 15/75* (2015.01); *E05F 2015/765* (2015.01); *E05Y 2400/86* (2013.01); *E05Y 2900/534* (2013.01)

(58) Field of Classification Search
CPC .... B60K 2015/0448; B60K 2015/0454; B60K 2015/0523; B60K 2015/053; B60K 2015/0538; E05F 15/70; E05F 15/75; E05Y 2400/86; E05Y 2900/534
USPC ........................................................ 296/97.22
See application file for complete search history.

(56) References Cited

U.S. PATENT DOCUMENTS

| | | | |
|---|---|---|---|
| 6,234,555 B1 | 5/2001 | Emmerich et al. | |
| 2004/0094230 A1* | 5/2004 | Ono | F17C 6/00 141/286 |
| 2005/0034776 A1 | 2/2005 | Watkins | |
| 2005/0039818 A1 | 2/2005 | Bauer | |
| 2009/0058132 A1 | 3/2009 | Browne et al. | |
| 2009/0079225 A1 | 3/2009 | Katou | |
| 2009/0309386 A1 | 12/2009 | Yamamoto | |
| 2010/0252565 A1* | 10/2010 | Pipp | B60K 15/05 220/825 |
| 2011/0140477 A1 | 6/2011 | Mihai | |
| 2011/0146157 A1 | 6/2011 | Bauer | |
| 2012/0158253 A1 | 6/2012 | Kroemke et al. | |
| 2012/0319830 A1* | 12/2012 | Rovik | B60K 15/05 340/438 |
| 2013/0056994 A1 | 3/2013 | Sago | |
| 2013/0074411 A1 | 3/2013 | Ferguson et al. | |
| 2013/0154402 A1 | 6/2013 | Basavarajappa et al. | |
| 2013/0234828 A1 | 9/2013 | Holzberg et al. | |
| 2014/0039766 A1 | 2/2014 | Miyake et al. | |
| 2015/0048644 A1 | 2/2015 | Georgi et al. | |
| 2015/0231968 A1 | 8/2015 | Dunger et al. | |
| 2017/0174074 A1* | 6/2017 | Wakamatsu | B60K 15/05 |

FOREIGN PATENT DOCUMENTS

| | | |
|---|---|---|
| DE | 68816045 | 2/1989 |
| DE | 4438610 A1 | 5/1996 |
| DE | 4440814 A1 | 5/1996 |
| DE | 694 00 812 T2 | 2/1997 |
| DE | 19535335 A1 | 3/1997 |
| DE | 198 32 910 A1 | 1/1999 |
| DE | 299 21 802 U1 | 3/2000 |
| DE | 19919251 A1 | 11/2000 |
| DE | 19935454 A1 | 3/2001 |
| DE | 10117536 A1 | 10/2002 |
| DE | 10153724 A1 | 5/2003 |
| DE | 102006042447 A1 | 11/2007 |
| DE | 112007000117 T5 | 11/2008 |
| DE | 102008040001 A1 | 5/2009 |
| DE | 102009023594 A1 | 12/2010 |
| DE | 102009058864 A1 | 6/2011 |
| DE | 102011111234 A1 | 2/2013 |
| DE | 102011114383 A1 | 3/2013 |
| DE | 102012009018 A1 | 11/2013 |
| DE | 202012007455 U1 | 12/2013 |
| DE | 10 2012 021 518 A2 | 5/2014 |
| DE | 10 2014 111 408 A1 | 2/2015 |
| DE | 102014103642 A1 | 8/2015 |
| EP | 0 621 154 B1 | 4/1994 |
| EP | 0 630 074 A2 | 6/1994 |
| EP | 0 704 331 A1 | 9/1994 |
| EP | 0 922 601 A1 | 11/1998 |
| EP | 1 293 374 A1 | 3/2003 |
| EP | 1 449 702 A2 | 1/2004 |
| EP | 1 464 529 A2 | 10/2004 |
| EP | 1 785 307 A1 | 5/2007 |
| EP | 2 392 755 A2 | 5/2011 |
| FR | 2765837 A1 | 1/1999 |
| FR | 2817511 A1 | 6/2002 |
| FR | 2915144 A1 | 10/2008 |
| FR | 2940772 A1 | 7/2010 |
| JP | 59-128015 | 7/1984 |
| JP | 2002-285755 A | 10/2002 |
| JP | 2005-133529 A | 5/2005 |
| JP | 2008-168748 A | 7/2008 |
| JP | 2009101755 A | 5/2009 |
| JP | 2012-056327 A | 3/2012 |
| JP | 2012-219469 A | 11/2012 |
| JP | 2013-57181 A | 3/2013 |
| JP | 2014-500414 A | 1/2014 |
| WO | WO 02/081248 A2 | 10/2002 |
| WO | WO 2008/084815 A1 | 7/2008 |
| WO | WO 2011/147593 A1 | 12/2011 |
| WO | WO 2013/041081 A2 | 9/2012 |
| WO | WO 2014/067883 A2 | 5/2014 |

OTHER PUBLICATIONS

International Search Report issued in corresponding PCT Application No. EP2017/050581 dated Mar. 31, 2017, 11 pages.

Japanese Notification of Reasons for Rejection dated Apr. 10, 2018 issued in corresponding JP Application No. 2016-549770, 3 pages, with English translation, 3 pages.

* cited by examiner

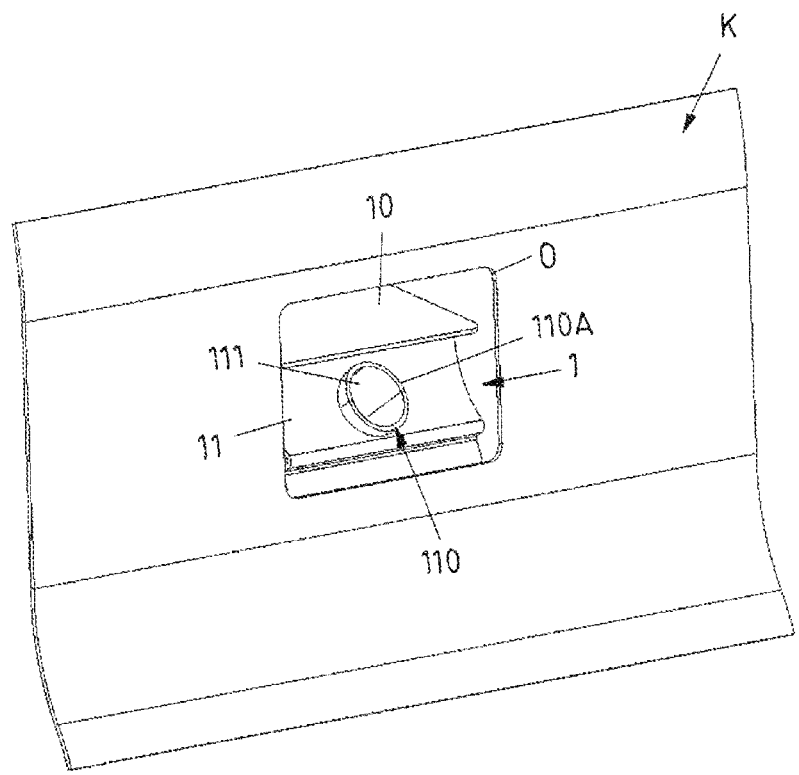

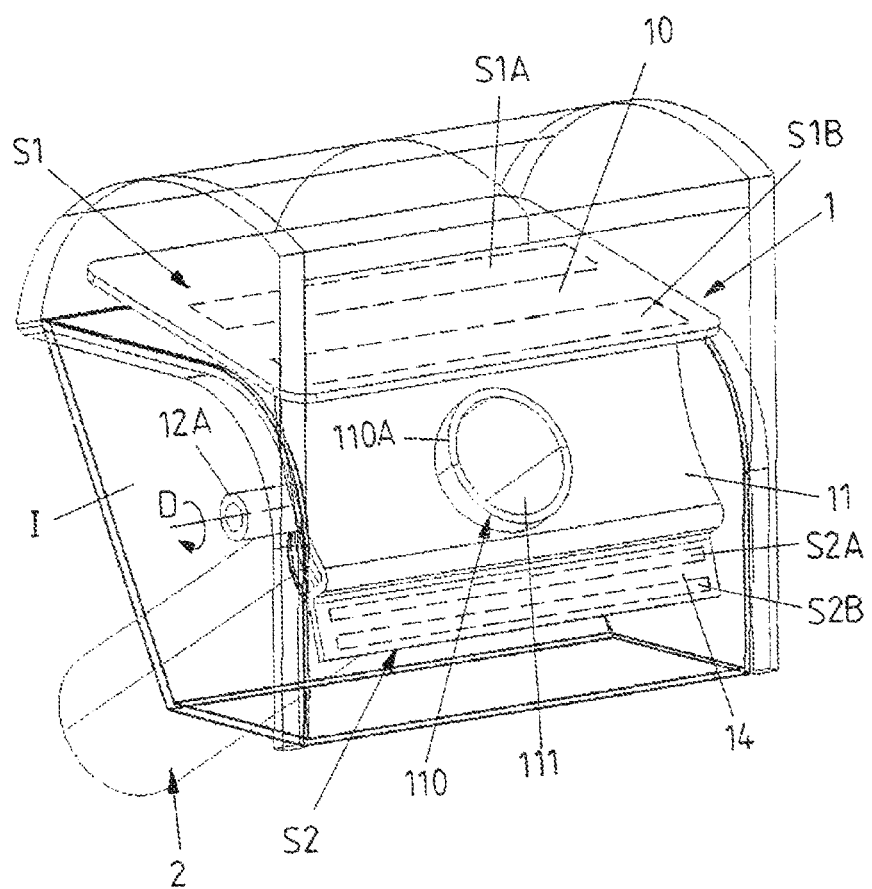

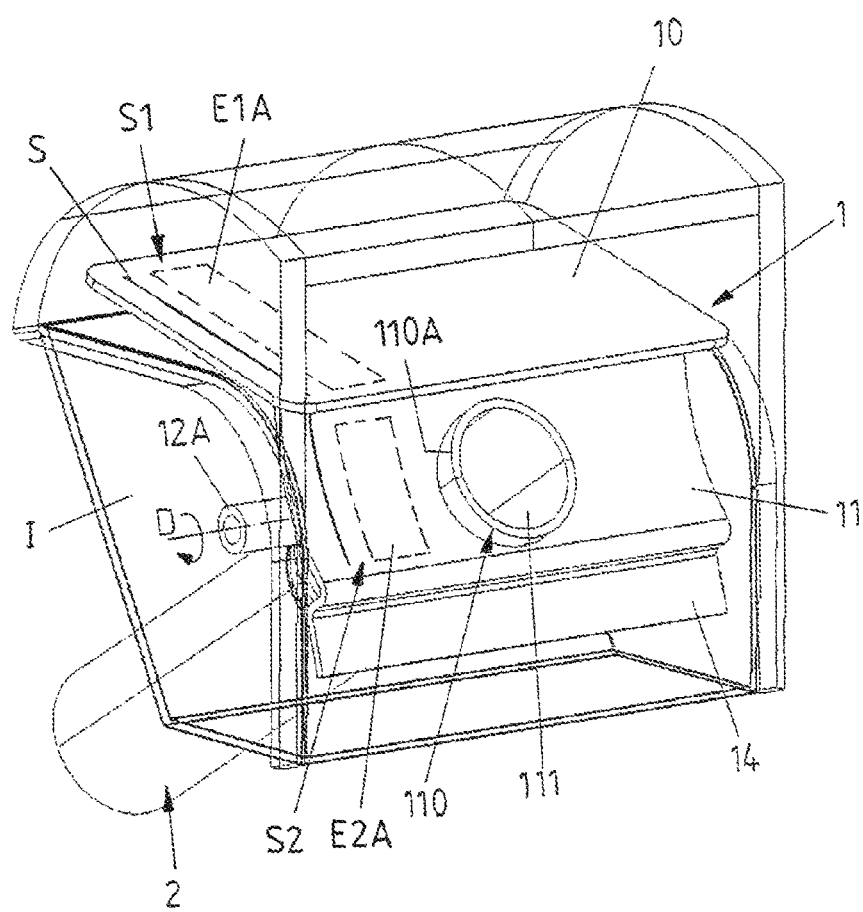

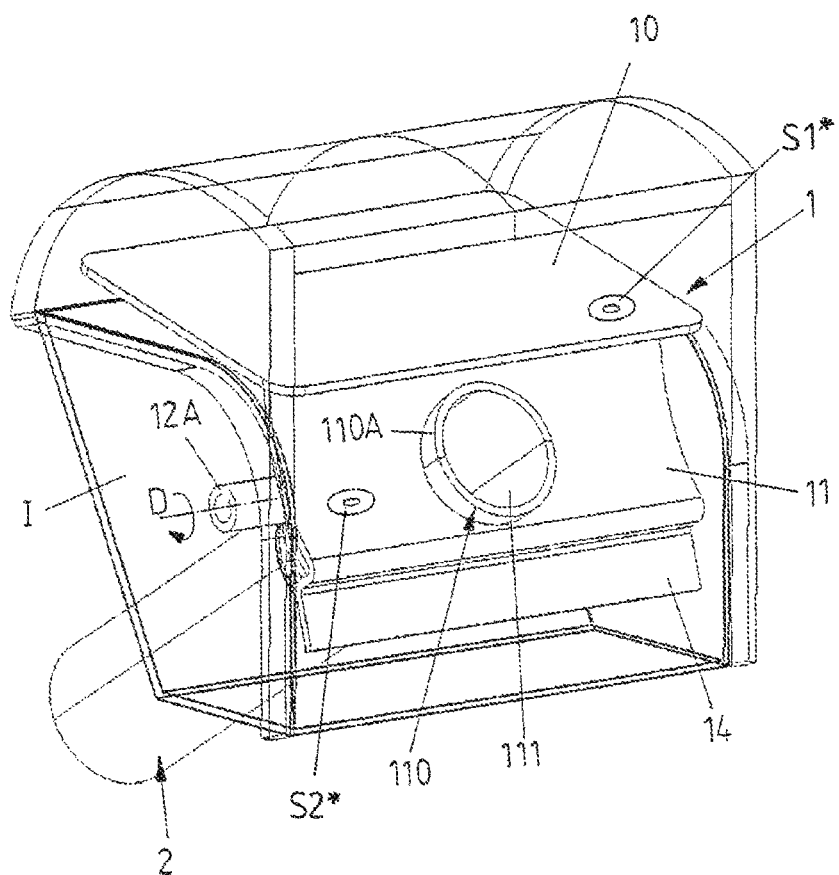

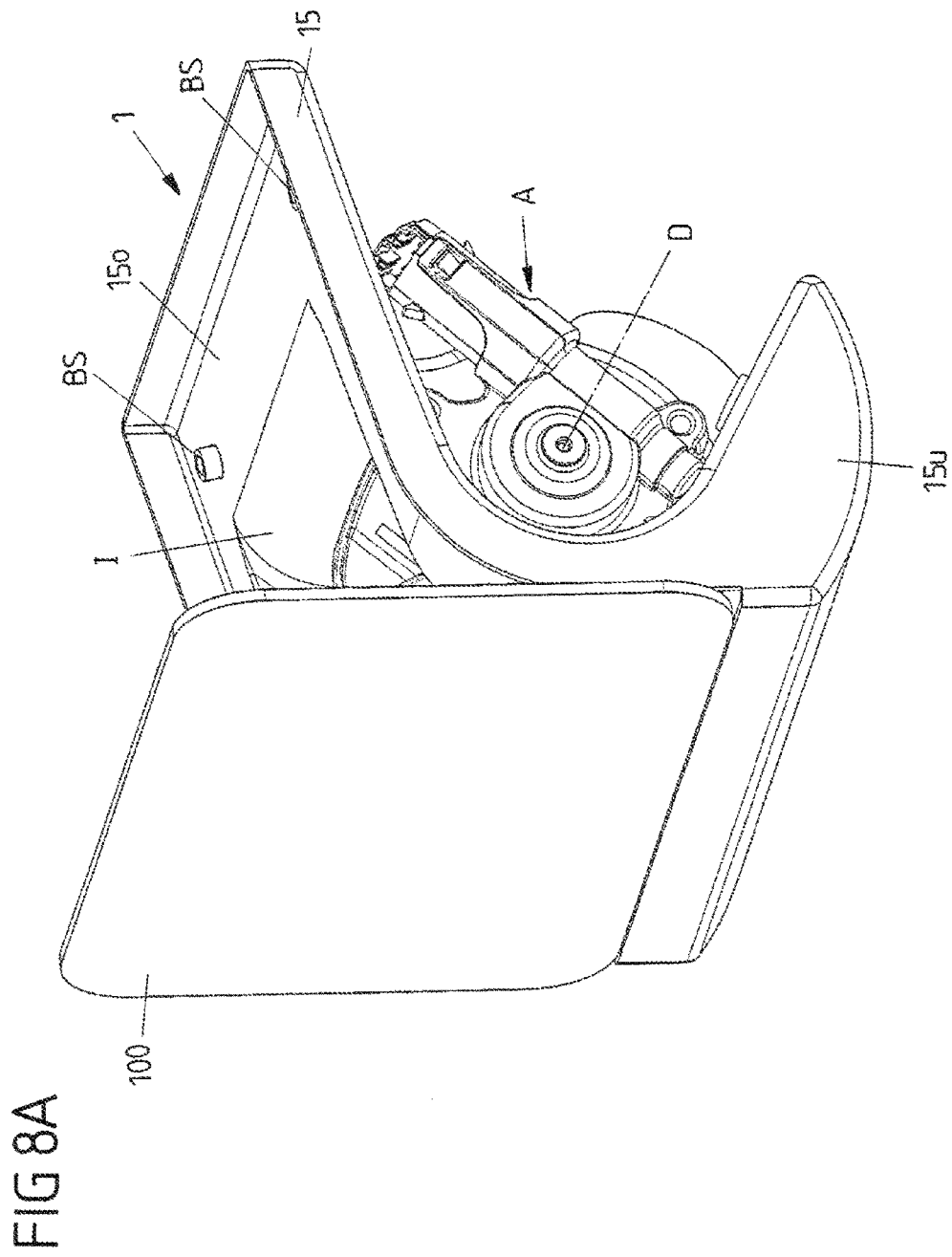

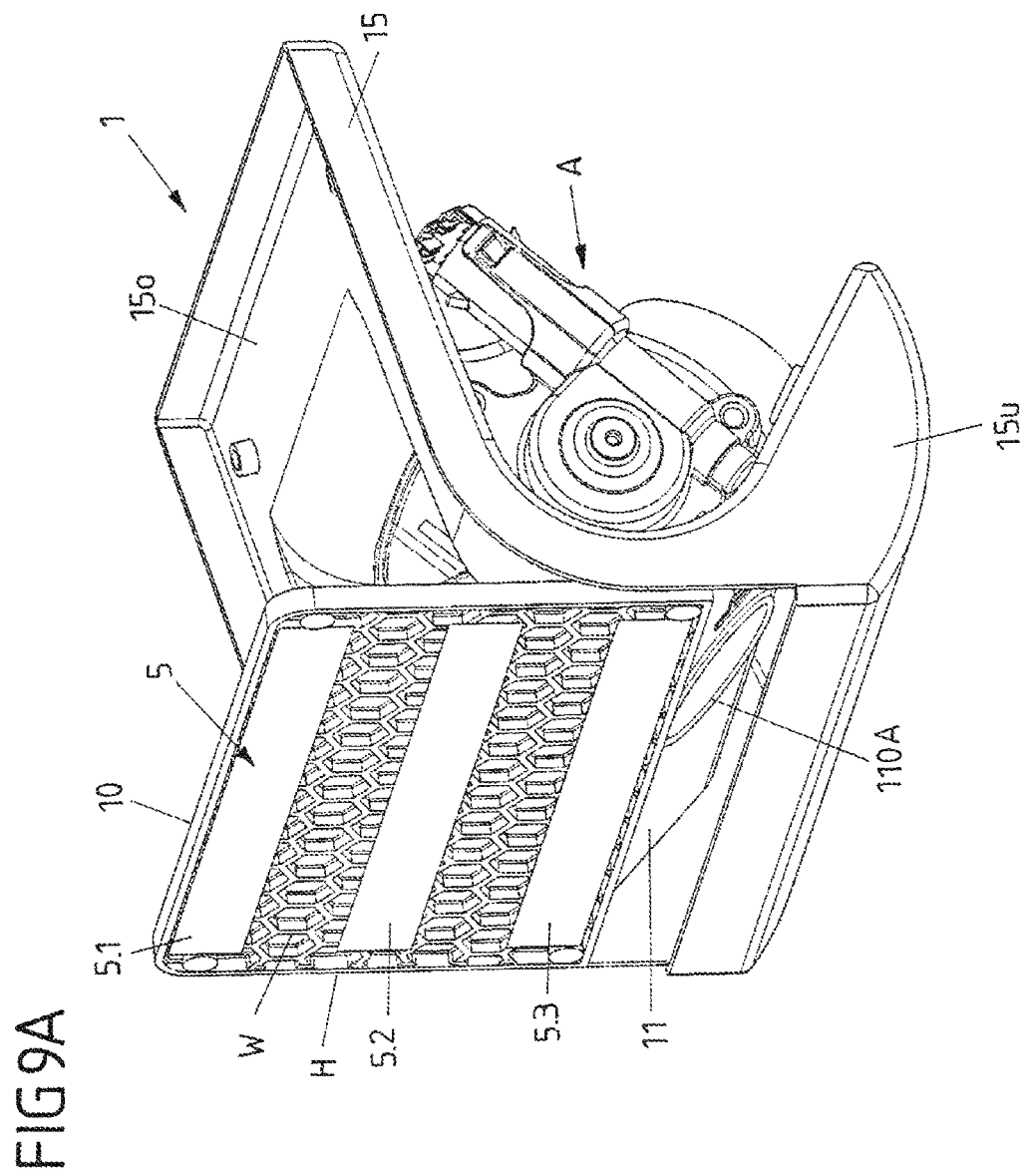

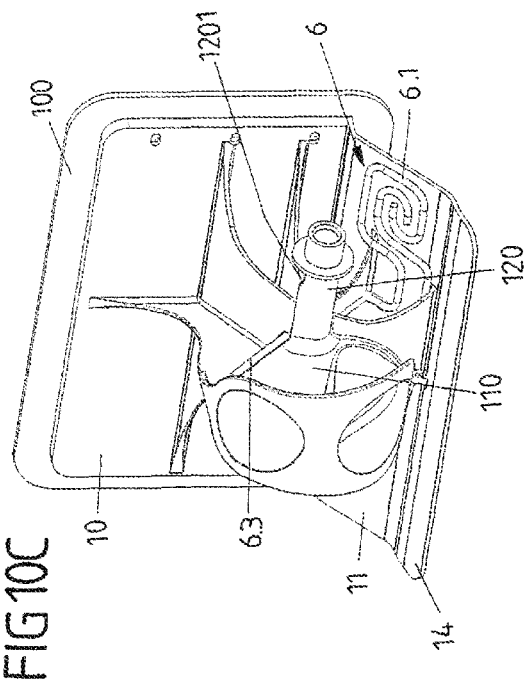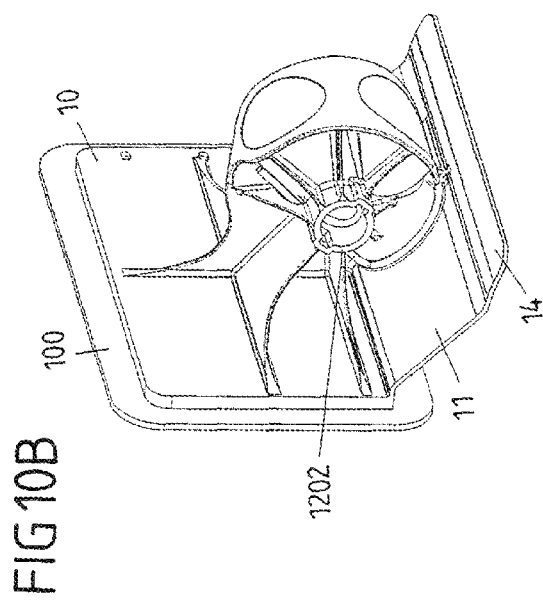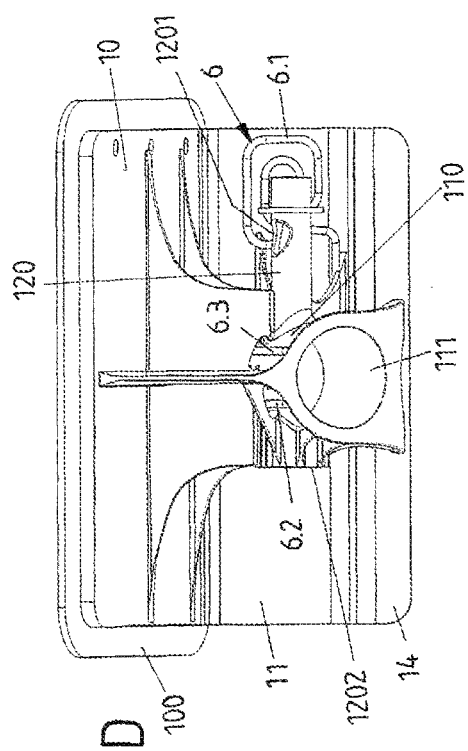

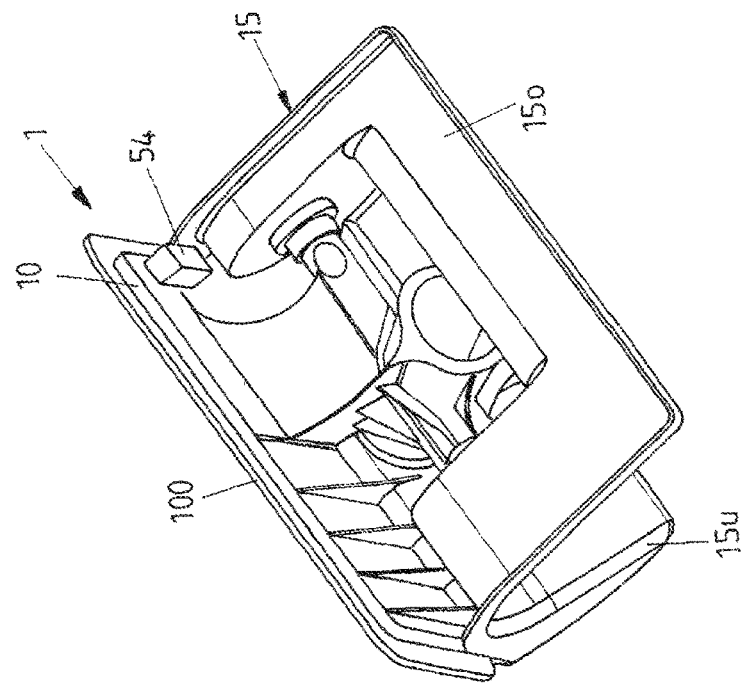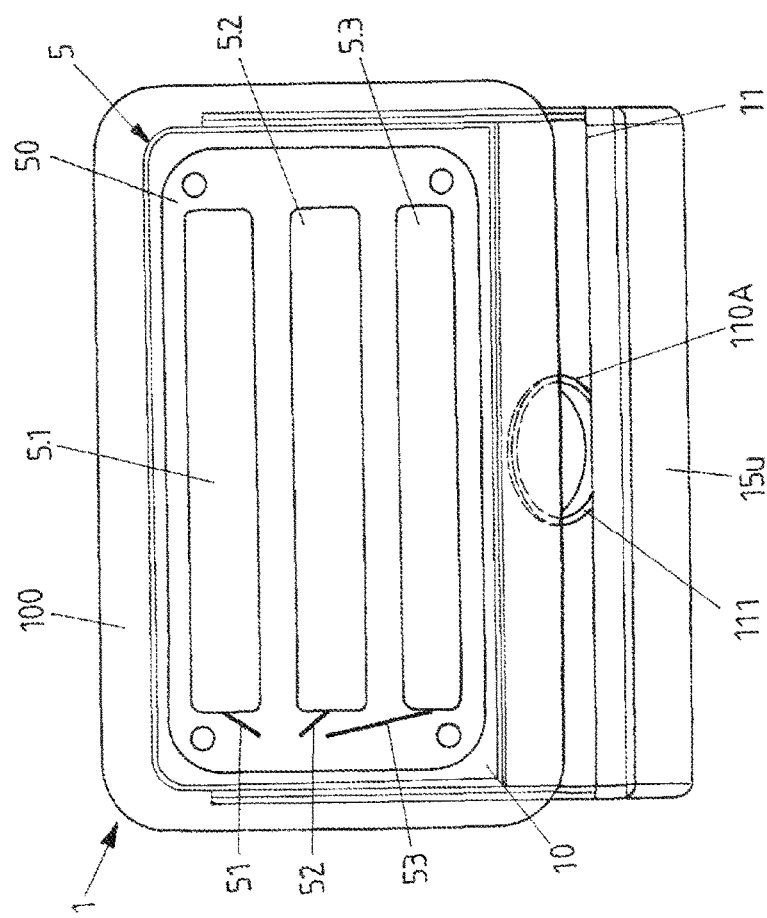

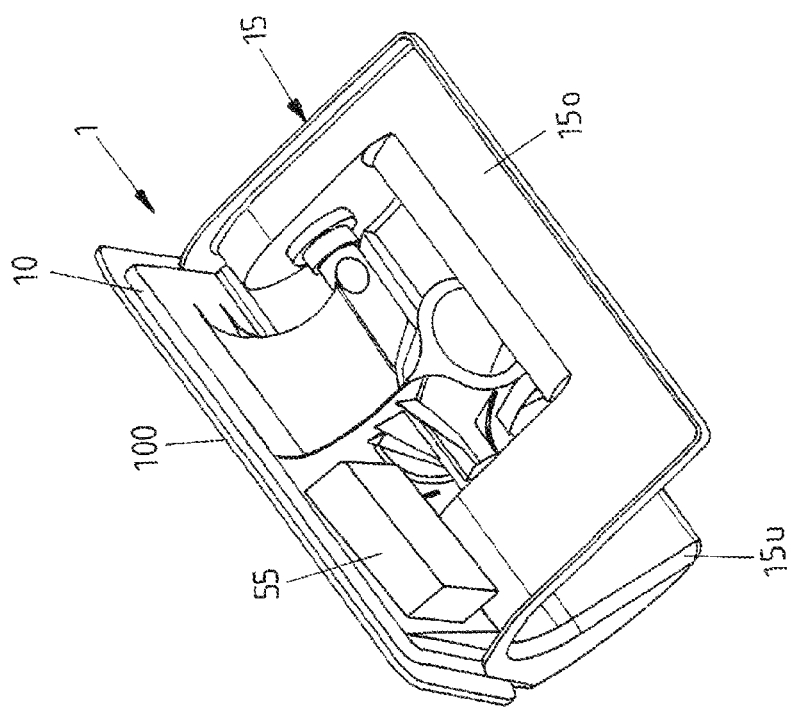
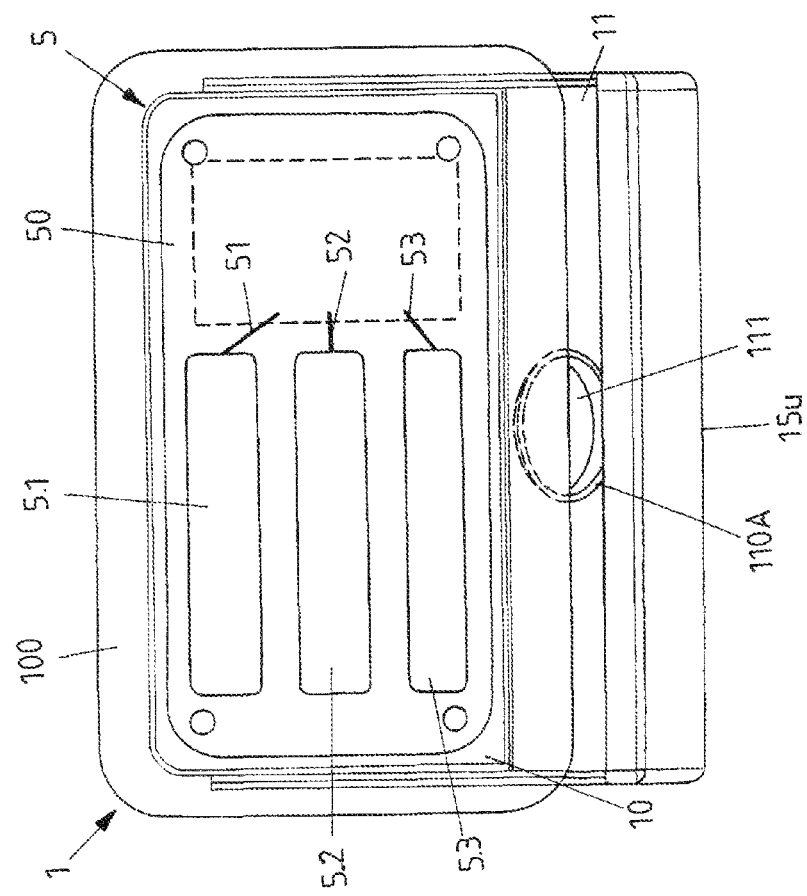

CLOSURE DEVICE FOR A FILLING OR CONNECTION OPENING ON A VEHICLE

CROSS-REFERENCE TO A RELATED APPLICATION

This application is a National Phase Patent Application of International Patent Application Number PCT/EP2015/052128, filed on Feb. 3, 2015, which claims priority of German Patent Application Number 10 2014 201 886.2, filed on Feb. 3, 2014, and of German Patent Application Number 10 2014 103 642.5, filed on Mar. 17, 2014.

BACKGROUND

The invention relates to a closure device.

A closure device of this type is provided for closing a through opening on a vehicle, for example in the region of the vehicle body. An interior space with a filling or connection opening is accessible via the through opening, it being possible for the through opening to be closed by way of a cover element. Said cover element can be adjusted on the vehicle between at least one closure position for closing the through opening and an open position for opening the through opening. The cover element of the closure device can therefore be, for example, a filler cap or a filler flap which covers or conceals an interior space which is provided on the vehicle body and within which a filler neck with a filling opening for a fuel tank is situated. In an analogous manner, a cover element can be formed by way of an adjustable covering or a cap, be formed around a through opening for access to a filling opening for filling a wiper water reservoir or to a connection opening for connecting a charging cable of an electric charging station for a battery drive of the vehicle.

In the case of closure devices which have been customary up to now, a separate closure element for closing the filling opening or connection opening has been provided in addition to a cover element. Thus, for example, a separate tank closure for sealing closure of the filling opening is as a rule provided in the case of a filler neck of a fuel tank, which tank closure has to be unscrewed from the filler neck after opening of the filler flap or the filler cap, in order for it to be possible to refill fuel via the filling opening. In the case of conventional closure devices, a plurality of hand movements are therefore necessary for a user, in order to make a filling opening or connection opening on the vehicle accessible. In order to increase the operating comfort, it has frequently been provided on vehicles in the meantime to adjust at least the cover element in a manner which is actuated by external force, for example by means of a spring drive or a hydraulic, pneumatic or electric drive motor. In this way, as a rule at least the adjusting of the cover element into its open position no longer has to take place manually.

It is proposed, furthermore, in DE 199 19 251 A1 to mechanically couple a cover element in the form of a displaceable filler flap to a closure element for closing a filling opening on a filler neck of the fuel tank, with the result that, when the filler flap is opened, the closure element is also automatically adjusted along with it and, as a result, the filling opening is opened. Here, the closure element is part of a valve device having a ball valve, with the result that the closure element is rotated when the filler flap is displaced as cover element. The closure element and the cover element in the form of the filler flap are formed in DE 199 19 251 A1 by two components which are separate from one another. Said components are coupled to one another, however, with the result that their adjusting movements influence one another mutually. A mechanical mechanism with at least one lever is provided here for coupling purposes. Although an increase in comfort in comparison with conventional closure devices is achieved by way of the closure device which is proposed in DE 199 19 251 A1, said closure device continues to have some disadvantages. For instance, the construction and assembly of the closure device is comparatively complicated, in particular, on account of the mechanical coupling which is provided via a mechanism, and is expensive and susceptible to faults on account of the multiplicity of necessary components.

Furthermore, DE 10 2009 058 864 B4 has disclosed providing a single sensor device on a closure device with a cover element in the form of a filler cap, which sensor device, once activated, controls firstly the opening of the filler cap and secondly the closing of the filler cap in a contactless manner. Here, the filler cap is opened when a person or an object has approached a proximity sensor of the sensor device to a defined distance. The closing takes place automatically when the person or the object moves away from the proximity sensor again.

A closure device of this type is susceptible to faults in some circumstances, since, for example, although an approach of a user to a filler cap first of all readily triggers its opening, the filler cap is already closed again if the user reaches for a pump nozzle and in the process moves too far away from the proximity sensor. Moreover, the sensor device cannot readily be accommodated on the adjustable filler cap itself, since the proximity sensor is also moved as a result of the adjustment of the filler cap and therefore possibly the influence of the vehicle body on the proximity sensor in the different adjusting positions has to be compensated for, in order to correctly control, in particular, the closing of the filler cap.

SUMMARY

It is therefore an object of the present invention to provide a closure device, by way of which the abovementioned disadvantages are avoided or at least reduced, and by way of which, in particular, the operating comfort for a user can be increased.

This object is achieved by way of a closure device as described herein.

A closure device according to the invention is provided for closing a through opening on a vehicle, an interior space with a filling or connection opening being accessible via the through opening, and it being possible for the through opening to be closed by way of a cover element which can be adjusted on the vehicle in a manner which is actuated by external force between at least one closure position for closing the through opening and an open position for opening the through opening. Here, a filling or connection opening is fundamentally preferably configured and provided for consumable filling on a vehicle, a consumable being, for example, an energy source for the vehicle drive, such as fuel, in particular gasoline, diesel or hydrogen, or a consumable liquid, such as engine oil, cooling liquid or wiper water for a windshield wiper system. Accordingly, a liquid reservoir, in particular a wiper water reservoir, a cooling liquid reservoir or an oil reservoir or a fuel tank, can be capable of being filled via a filling opening, and a connection opening can be provided for connection to a charging station, in particular a charging station for battery or fuel cell drives.

According to a first aspect of the invention, a control electronics system for triggering an adjustment of the cover element is provided with a first and a second sensor device, it being possible for an operating event for opening the cover element to be detected via the first sensor device, and it being possible for an operating event for closing the cover element to be detected via a second sensor device which is spaced apart spatially from the first sensor device. Here, the sensor devices are provided at least in parts on different sections of the cover element, with the result that parts of the first sensor device are arranged on a different section of the cover element than parts of the second sensor device.

As a result of the use of two different sensor devices which are used firstly for the adjustment into the open position and therefore in order to open the cover element and secondly for adjusting into the closure position and therefore for closing the cover element, and said at least two sensor devices being arranged spaced apart from one another spatially, the sensor devices can be adapted in an improved manner for the respective function and can be positioned easily on the cover element itself. Thus, for example, the first sensor device for opening the cover element can be provided at least partially on a section of the cover element which is readily accessible for a user in the closure position of the cover element, and/or on which a monitoring region can be produced in the surroundings of the through opening in the closure position of the cover element. In contrast, the second sensor device can be arranged at least partially on another section of the cover element which can be reached easily by the user precisely in the open position, and/or at which another monitoring region for detecting an operating event which leads to closing of the cover element can be produced in the surroundings of the through opening when the cover element is open.

It can accordingly be avoided that a single sensor device has to be arranged on a section of the cover element which is readily accessible for a user both in the case of an open and in the case of a closed cover element, and/or a respectively adequate monitoring region can be produced in both cases in the surroundings thereof. Rather, the individual sensor devices which are spaced apart spatially can be adapted to their respective function in a targeted manner, designed and specifically positioned on the cover element. In this way, the control electronics system of the closure device is more robust with respect to changes in the surrounding conditions, and any faulty triggering can be avoided more easily. At the same time, the operating comfort for a user of the closure device can be increased considerably.

Against this background, the first sensor device for opening the cover element is provided according to the invention at least in parts on a covering section of the cover element, which covering section closes the through opening at least partially in the closure position. The second sensor device is in turn provided at least in parts on a section of the cover element, which section is different than said covering section and faces the through opening in the open position of the cover element. As a consequence, depending on the adjusting position of the cover element, a different section of the adjustable cover element is arranged in or on the through opening, on which section the matching sensor device is then also arranged partially or completely, via which sensor device a control signal can be generated for adjustment into the other adjusting position. As a consequence, the first and second sensor device is arranged in each case on that section which is more readily accessible in the closure position or in the open position and/or lies closer to the through opening.

Sensor elements of the respective sensor device, via which an electromagnetic field of a proximity sensor or a sensor surface to be touched of a contact sensor is defined, are preferably arranged on the cover element, to be precise spaced apart spatially from at least one sensor element of another sensor device.

Each of the sensor devices which are used can be based on different measuring principles. For example, a sensor device can operate in a capacitive, inductive and/or optical, in particular camera-based, manner. It goes without saying here that different measuring principles can also be combined with one another in each of the sensor devices. However, at least one of the sensor devices preferably operates in a contactless manner and permits the detection of an operating event for opening or closing the cover element, without it being necessary for this purpose for a user to touch part of the closure device or the vehicle.

In one design variant, a closure section which is preferably adapted to the dimensions of the filling or connection opening and closes the filling or connection opening in the closure position of the cover element is configured on the cover element, via which the through opening can be closed. Therefore, a closure section for the filling or connection opening is integrated on the cover element and is, for example, formed on it or formed out of it. Here, the cover element therefore forms at least one covering section for closing the through opening and a closure section for separate closing of the filling or connection opening which is provided within the interior space which is accessible via the through opening.

The filling or connection opening within the interior space can also be accessible in the open position of the cover element via at least one implement which is provided by the closure device and, in particular, by the cover element. Here, the filling or connection opening can be capable of being used more easily through the through opening from the outside via the at least one implement, for example for refilling a reservoir or tank or for connecting a connecting line or a connecting cable. It is provided for this purpose in one exemplary embodiment that the adjustable cover element forms a connecting section with a connecting channel which ends on or in the filling or connection opening in the open position of the cover element. As a result, the closure device forms a connecting section with a connecting channel here on an adjustable cover element. Here, one end of said connecting channel is accessible at the through opening, and a connection to the filling or connection opening is established at the other end of said connecting channel when the cover element is situated in an open position for opening the through opening.

For example, in the case of a filling opening, a consumable in the form of a fluid, for example a fuel, such as gasoline, diesel or hydrogen, can be conducted in a targeted manner to the filling opening via a connecting channel of this type. In the case of a connection opening, a guide for a cable or a line and/or a connection plug to be connected to the connection opening is provided, for example, via the connecting channel, via which connection plug a connection to a charging station takes place. A connecting channel can have, for example, a circular cross section and/or at least one funnel-shaped section, in order to facilitate the filling via a filling opening or the connection of a cable or a line to a connection opening.

In the case of a filling opening for a wiper water reservoir or a fuel tank, an extension for a filler neck which has the filling opening can be provided, for example, via the connecting channel when the cover element is situated in its open position. Thus, for example, a pump nozzle or a refueling boom or a refilling funnel is then simply plugged onto the connecting channel which projects further in comparison with the filler neck, in order to refill wiper water or fuel into a tank of the vehicle.

In one design variant, the cover element is configured in one piece, with the result that a closure section and/or connecting section which is configured on the cover element is not fastened releasably to the latter, but rather is formed on or from the cover element. For example, the cover element is configured as a plastic part with at least a covering section (for the through opening), a closure section (for the filling or connection opening) and a connecting section (with connecting channel) formed thereon.

In a further design variant, the cover element is configured in multiple pieces. It therefore comprises at least two parts which are fastened to one another. Here, a cover part with a covering section configured thereon (for the through opening) and a closure section and/or connecting section is preferably provided, and a screen which is fastened thereto. Here, the screen forms an outer surface of the cover element, which outer surface is visible in or above the closed through opening in the closure position. Here, the screen can be plugged, in particular clipped, onto the covering section of the cover part. In this way, the screen not only can be mounted simply, but rather can also be replaced if required in a rapid and uncomplicated manner.

By way of the use of a separate screen, the cover part with the covering section and a closure section and/or connecting section can be produced with a focus on the mechanical strength, whereas the screen is produced with regard to a particularly advantageous esthetic effect or appearance. For example, the screen projects on an outer skin of the vehicle in the closure position of the cover element and is produced from a high quality metallic material or a high quality plastic material.

A hydraulic, pneumatic or electric motor drive can be provided, for example, for the adjustment of the cover element in a manner which is actuated by external force, with the result that an adjustment of the cover element (at least from a closure position into an open position) can take place in a controlled manner by motor, without it being necessary for a user to manually apply a force to the cover element. As a result of an adjustment of the cover element, such as a filler cap, in a manner which is actuated by external force, the operating comfort can be increased considerably. Here, an adjustment of the cover element preferably takes place in both adjusting directions, that is to say both from the closure position into the open position and also vice versa. This can avoid a situation where a user possibly comes into contact with dirty components of the closure device, for example an outer side of a filler cap, when refilling a consumable via the filling opening or for the connection of a cable or a line to a connection opening.

In the case of a closure device having an adjusting mechanism which is actuated by external force, furthermore, at least one proximity sensor can be provided, by means of which an adjustment of the cover element which is actuated by external force can be triggered by a user in a contactless manner. A proximity sensor of this type can operate, for example, in a capacitive, optical or inductive manner. A signal for adjusting the cover element can be triggered via a proximity sensor or a plurality of proximity sensors, for example, by virtue of the fact that a user performs a defined gesture in the region of the cover element. As an alternative or in addition, a defined object can be detected in the region of the cover element via a corresponding sensor system, and the adjustment of the cover element can then be triggered. For example, the adjustment of a filler cap can take place automatically if a pump nozzle or a charging plug is detected by sensor in the region of the cover element.

In one design variant, the closure device can comprise at least one sensor device with at least one contact sensor, optionally also in addition to a proximity sensor which operates in a contactless manner, it being possible for an adjustment of the cover element which is actuated by external force to be triggered by means of the contact sensor by a user via contact with a sensor surface. The provision of a contact sensor provides an option for a user to control the adjustment of the cover element in a more targeted manner. The user has to actively touch or actuate a sensor surface which is defined by the contact sensor, before a defined adjustment of the cover element is carried out. For example, a combination of sensor devices with proximity and contact sensor systems can be provided.

Thus, an operating event for opening the cover element, for example an approach of the user or a defined object toward the cover element (for example, the approach of a pump nozzle in the case of a filler cap) or a gesture of the user in the region of the cover element, can be capable of being detected by at least one proximity sensor of the first sensor device in a contactless manner and can trigger the opening of the closed cover element. For later closing of the cover element, however, the user then has to touch a sensor field (preferably on the cover element) which is defined by a contact sensor of the second sensor device.

In one exemplary embodiment, it can be detected via a sensor device whether an object, for example a pump nozzle, is introduced into the connecting channel. Automated closing of the cover element can take place here in a manner which is dependent on whether an object is still detected in the connecting channel. For example, the removal of a pump nozzle from the connecting channel can trigger an adjusting signal which leads to closing of the cover element. As an alternative, a further operating event which is triggered in some other way by a user and an adjusting signal which is associated therewith lead to closing of the cover element if, in addition, the removal of the object from the connecting channel has been detected. As a result, an additional safety routine is provided which prevents the cover element from being adjusted in an unintentional manner while an object is still situated in the connecting channel and, for example, a pump nozzle is still plugged into an open filler cap as cover element.

In one development, the control electronics system of the closure device can have an evaluation logic means which triggers closing of the cover element only when it has been detected that an object has no longer been situated in the connecting channel for a predetermined time period. It can therefore (additionally) be detected via the first or second sensor device or via at least one additional third sensor device if an object has been removed from the connecting channel. If a (delay or safety) time period which is stored in the evaluation logic means elapses after this, for example at least three, five or seven seconds, without an object being introduced again into the connecting channel, an adjustment of the cover element is triggered or permitted. This can be advantageous, in particular, in the case of one embodiment with a cover element which is configured as a filler cap, in order to close the filler cap in an automated manner only after it has been detected by sensor that a pump nozzle is no longer plugged into a connecting channel which is integrated into the filler cap and ends at the filler neck of the fuel tank in the open position of the filler cap. Here, closing of the filler cap can take place automatically after the pump nozzle has been removed and a predefined time period has elapsed. In one development, closing of the filler cap takes place only after the predefined time period has elapsed and if additionally a corresponding operating event has been detected before or afterward in a contactless manner or via a contact sensor.

In this design variant, in particular, an (additional) operating event for closing the cover element can be detected via a vehicle electronics system and a corresponding control signal can be transmitted to the control electronics system. For example, automatic closing of a cover element which is still open takes place after an engine of the vehicle has been started or if the vehicle reaches a stored driving speed. This can achieve a situation, for example, where a cover element in the form of a filler cap is closed automatically when the evaluation logic means of the control electronics system of the closure device has detected that no object has been situated in the connecting channel, optionally for a predefined time period, and additionally the vehicle engine is started or the vehicle is already driving. This avoids a situation where the filler cap unintentionally remains open during driving.

A further aspect of the present invention which can readily be combined with the abovementioned aspect of the invention relates to a closure device, in which the cover element has a screen which lies on the outside and is fastened to a covering section of the cover element, which covering section closes the through opening at least partially in the closure position, and at least one sensor device of the closure device is accommodated at least in parts in an intermediate space which is formed between the covering section and the screen, and/or in a cavity of the covering section and/or in a cavity of the screen.

For example, a proximity sensor and/or a contact sensor of a sensor device for the adjustment of the cover element in a manner which is actuated by external force can be accommodated at least partially, preferably completely in an intermediate space which is formed between the covering section for closing the through opening and a screen in an embodiment of this type of the cover element. In this way, a proximity sensor and/or a contact sensor can be accommodated on the cover element in a particularly space-saving manner. As an alternative or in addition, a proximity sensor and/or a contact sensor can be accommodated at least partially in a cavity of the covering section or the screen. For example, a cutout for receiving at least one proximity sensor and/or contact sensor is configured on the covering section of a cover part, and said cutout is covered by the screen.

In addition, an adjustment of the cover element in a manner which is actuated by external force can be triggered mechanically by a user, for example by way of actuation of an actuating element in the vehicle interior or on the cover element.

At least one electric line for one or more sensor devices can be embedded at least partially into the material of the cover element. For example, an electric line can be encapsulated by injection molding and/or vapor deposited onto a surface of the cover element, with the result that wiring is simplified and shielding of the line can be dispensed with. As an alternative or in addition, at least one electric line can be subsequently laid on the cover element and can be held thereon, for example, on reinforcing ribs of the cover element. For example, an electric line can be clipped on via at least one holding clip which is integrated onto the cover element.

The cover element can in principle be mounted rotatably via a bearing pin. Furthermore, it is provided in one design variant to route at least one electric line for a sensor device at least partially in a hollow bearing pin section within a bearing pin of this type. The electric line is therefore routed at least with a section within the bearing pin, in order to accommodate and to lay the line in a space-saving manner. Here, the bearing pin can be of hollow configuration completely or else only in one section, in order to receive the electric line or a plurality of electric lines.

In one development, an illumination element and/or a display element can be provided on a cover element.

Here, an illumination element comprises at least one lamp, for example an LED, in order to illuminate the cover element in its closure position and/or in its open position. In this way, for example in the case of an open filler cap, a filling opening for the pump nozzle can be illuminated, in order to facilitate the introduction of the pump nozzle for a user even in the case of relatively low ambient light.

Additional information can be provided visually to a user via a display element, for example in the open position of the cover element. In the case of a filling opening which is closed by way of the cover element for a liquid reservoir, such as a filler cap or a cover for a wiper water reservoir, a cooling liquid reservoir or an oil reservoir, a filling level of the liquid reservoir can be displayed, for example, via a display element or a plurality of display elements. For this purpose, the display element can comprise, in particular, one or more lamps, in order to visually represent the filling level. For example, a different number of lamps can be activated depending on the filling level. As an alternative or in addition, a user can be signaled visually via at least one display element as to whether the cover element has assumed its closure position and/or its open position as intended and/or as to whether an object is situated in a possibly present connecting channel.

In one exemplary embodiment, a display unit can be used to indicate whether a pump nozzle has been correctly introduced into and/or removed from a connecting channel of a filler cap.

A display element can also comprise a display, via which information is displayed, for example vehicle data, such as tire pressure or the type of fuel to be filled. However, how the closure device is to be operated or how a connection of a connection opening which can be closed via the cover element is to take place to a charging station, in particular a charging station for battery or fuel cell drives, can also be capable of being displayed via a display, for example in the form of a video.

In principle, both an inner (that is to say, lying within the interior space) filling or connection opening and an outer through opening can be closed in a simple way by way of a closure device having a cover element, on which a closure section is configured. Via the cover element, both the through opening and the filling or connection opening which lies behind it are therefore closed in the closure position of said cover element. Thus, for example, a through opening which is visible on an outer side, for example on the vehicle body, is closed in one exemplary embodiment by way of a cover element which, within the interior space which is accessible via the through opening, at the same time closes a further opening, spaced apart from the former, in the form of a filling opening or connection opening. According to the invention, a cover element therefore assumes two functions which, for example in the case of a filler neck of a fuel tank, are assumed by two different components, for example firstly a filler cap or cover and secondly a filler closure.

Here, a covering section and a closure section can be configured on the cover element in such a way that a through opening and a filling or connection opening which do not lie in mutually parallel planes can be closed via them. Thus, for example in the case of a filler neck for a fuel tank, a filler cap extends in the closed state substantially along a vertical line on the outer side of the vehicle body, whereas the filling opening of the filler neck runs obliquely with respect thereto, in order to facilitate plugging of a pump nozzle or a refueling boom.

The closure section preferably bears within the interior space against an edge of the filling or connection opening when the through opening is closed via the cover element. In this way, secure and preferably complete closing of the filling or connection opening is ensured via the closure section. To this end, the entire filling or connection opening can be covered via the closure section in the closure position of the cover element.

It is preferred, furthermore, that the closure section closes the filling or connection opening sealingly in the closure position of the cover element. For this purpose, a preferably circumferential seal, for example in the form of a sealing lip, can be provided on an edge of the filling or connection opening, against which edge the closure section bears in the closure position. As an alternative or in addition, the closure section can have a seal for closing the filling or connection opening sealingly.

In order to make not only the interior space accessible via the through opening in the open position of the cover element, but rather also the filling or connection opening, it is provided in one exemplary embodiment that the filling or connection opening is opened by way of the closure section in the open position of the cover element. As a consequence, the closure section of the cover element is displaced during an adjustment of the cover element, in such a way that the closure section likewise no longer (completely) closes the filling or connection opening.

The configuration of a connecting section with a connecting channel which is connected to the filling or connection opening in an open position of the cover element can otherwise also be advantageous in the case of an adjustable cover element which does not form any closure section for closing the filling or connection opening in the closure position of the cover element. Thus, in the case of an embodiment of this type, a separate closure element might in principle be provided, furthermore, in addition to the cover element, in order to (sealingly) close the filling or connection opening via the separate closure element. Accordingly, said separate closure element would have to be removed from the filling or connection opening if the cover element is adjusted or has already been adjusted into its open position. In a design variant of this type, the cover element and the separate closure element are preferably coupled mechanically to one another or are activated via an adjusting mechanism which is actuated by external force, in such a way that the opening of the filling or connection opening takes place via a separate closure element together with the adjustment of the cover element into its open position.

In the case of a cover element having a connecting channel, it is provided in one exemplary embodiment that the connecting section protrudes with the one end of the connecting channel through the through opening out of the interior space when the cover element is situated in its open position. A filling or connection opening can be made more readily accessible for a user via a connecting section which projects at least partially beyond an edge of the through opening in the open position. Thus, the filling of a fluid or the plugging of a cable or a line can be performed on or via the projecting connecting channel, with the result that a user no longer has to act directly on the filling or connection opening for this purpose.

In design variants which are considered to be advantageous, the cover element can be adjusted within the interior space. The adjustment of the cover element preferably takes place in such a way that the cover element can be adjusted within the interior space between a closure position and an open position, and the cover element is arranged here, in particular in its open position, virtually completely within the interior space and not disruptively outside the interior space. In particular, a closure section of the cover element for closing the through opening can be received completely within the interior space in a design variant of this type when the cover element is situated in its open position. In this way, for example, a covering section with an outer side which is visible in the closure position on a cover element in the form of a filler cap can be capable of being moved completely into the interior space and/or within the interior space, via which the filler neck of the vehicle fuel tank is accessible.

For the adjustability of the cover element, the latter can be mounted rotatably. Here, a rotatable mounting for the cover element can be realized, for example, via at least one plain bearing and/or one ball joint.

In the case of a rotatable mounting of the cover element, a sealing face for closing the filling or connection opening sealingly can be configured concentrically or arcuately with respect to the rotational axis of the cover element. As an alternative, a sealing face is not configured concentrically or arcuately with respect to the rotational axis, but rather extends at a predefined angle with respect to the rotational axis and/or with respect to a plane, in which the through opening lies. Here, the cover element is preferably mounted in such a way that a rotational movement of the cover element leads to a virtually linear adjusting movement of the closure section onto the sealing face which is provided at an edge of the filling or connection opening.

In addition to the adjustment of the cover element in a manner which is actuated by external force via an electric motor drive, a mechanical emergency unlocking means can be provided. In this way, the accessibility of the filling or drive opening is ensured even when the drive has failed or no electric power for operating the drive is available, for example when a vehicle battery is discharged.

A mechanical emergency unlocking means can be provided, for example, by way of an unlocking mechanism, in the case of which locking elements which are coupled to a drive element of the drive can be transferred manually out of an automatically assumed locked position into an unlocked position. Here, a flexible drawing means, in particular a Bowden cable, can be provided, in particular, for manual actuation of the unlocking mechanism.

In one design variant, a drive element which can be rotated about a drive axis is coupled to at least one locking element which can be adjusted substantially perpendicularly, in particular radially with regard to the drive axis. Said at least one locking element is prestressed into a locked position, in which the locking element blocks a rotation of the drive element and therefore prevents unintentional or improper adjustment of the cover element which is connected to it. In the case of an adjustment of the cover element which is controlled via the drive, the locking element is transferred in a manner which is actuated by external force into its unlocked position, and therefore a rotation of the drive element is made possible. The locking element or a plurality of locking elements are connected to a manually actuable actuating element, for example in the form of a Bowden cable, with the result that a transfer into an unlocked position can also be performed manually and, in contrast, the drive element is not blocked if the drive fails.

In one exemplary embodiment, the drive element can be adjusted along the drive axis, and at least one locking element is coupled to the drive element and is mounted displaceably on a guide section in such a way that the locking element can be adjusted out of its locked position into its unlocked position by way of an axial adjustment of the drive element. A manual adjusting force can then also be transmitted to the drive element via an actuating element, in order for it to be possible to manually release a locking action if required and to perform a manual adjustment of the cover element.

As a result of the provision of an adjusting mechanism which is actuated by external force for adjusting a cover element, increased safety against unauthorized or improper opening of the cover element can in principle be provided. For example, the adjusting mechanism is designed to be self-locking with the associated drive for this purpose, with the result that an adjustment of the cover element is not made possible without actuation of the drive.

BRIEF DESCRIPTION OF THE DRAWINGS

Further advantages and features of the invention will become clear in the following description of exemplary embodiments using the figures.

FIGS. 1A-1B show a first exemplary embodiment of a closure device according to the invention with a pivotable cover element in the form of a filler cap, via which both a through opening in a vehicle body and a filling opening of a filler neck can be closed, and additionally, when the filler cap is open, a connecting channel which is connected to the filling opening of the filler neck and passes through the filler cap is provided for filling fuel, FIGS. 1A and 1B showing the filler cap in different positions with a view of the vehicle body from the outside.

FIGS. 7A-7D show four variants of the closure device from FIGS. 1A-1B in a perspective view and with the filler cap in each case in an open position, and with in each case differently arranged first and second sensor devices for automated opening and closing of the filler cap.

FIGS. 8A-8C show different views of a second exemplary embodiment of a closure device according to the invention with a pivotable cover element in the form of a filler cap with a screen and a module housing, on which the pivotable filler cap is mounted with its drive.

FIGS. 9A-9C show the closure device from FIGS. 8A-8C in different views, from which the arrangement of a plurality of sensor elements of a first sensor device in a cavity which is closed by the screen is illustrated.

FIGS. 10A-10D show the closure device from FIGS. 8A-8C in different views, from which, in particular, the arrangement of a second sensor device on the filler cap is illustrated.

FIGS. 11A-11B show different views of one development of the exemplary embodiment from FIGS. 8A-10D with a printed circuit board which is integrated into the filler cap for the first sensor device.

FIGS. 12A-12B show a further, alternative development of the closure device from FIGS. 8A-10D with a printed circuit board which is likewise integrated into the filler cap for the first sensor device.

DETAILED DESCRIPTION

Figure 1A:
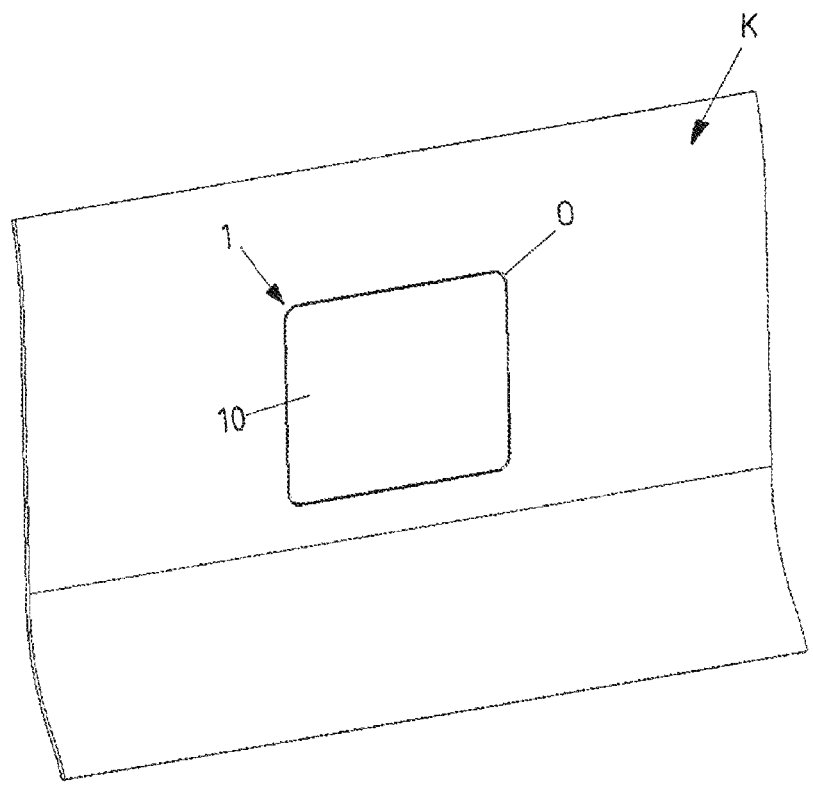
Figure 2A:
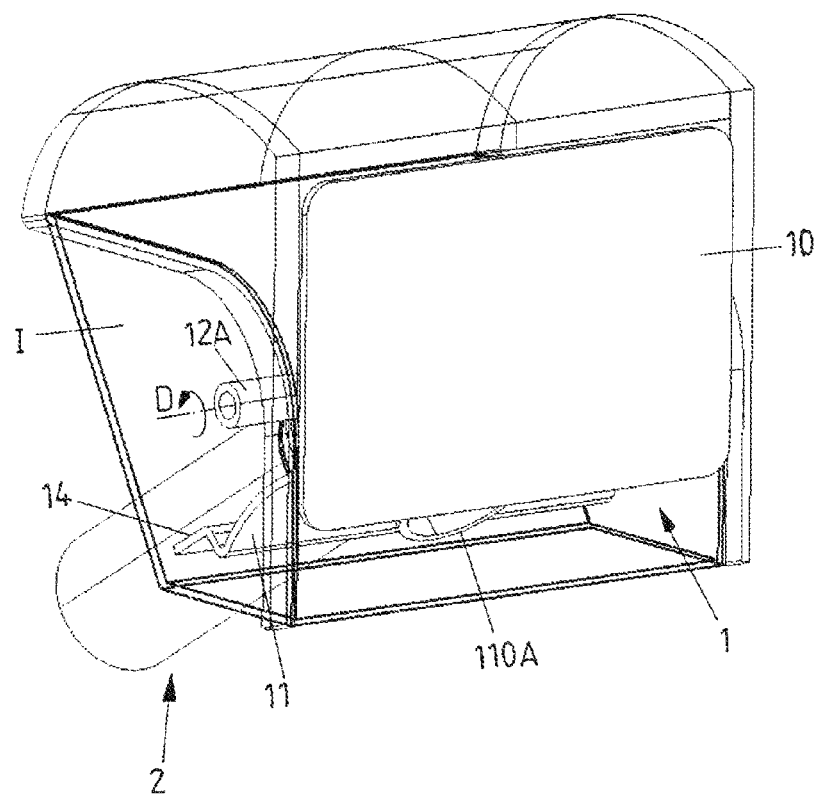
FIGS. 2A-2B show the closure device from FIGS. 1A and 1B on an enlarged scale, in particular with an illustration of an interior space within the vehicle body, in which interior space the filler neck of the vehicle tank ends and which interior space can be closed by way of the filler cap.
Figure 2B:
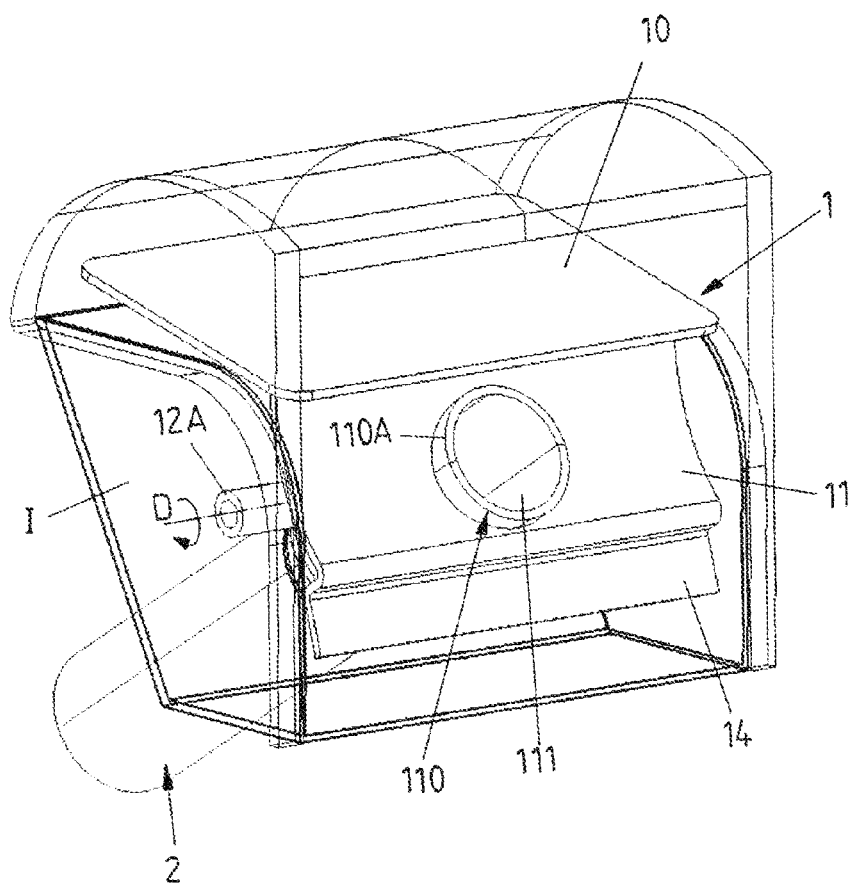
Figure 3A:
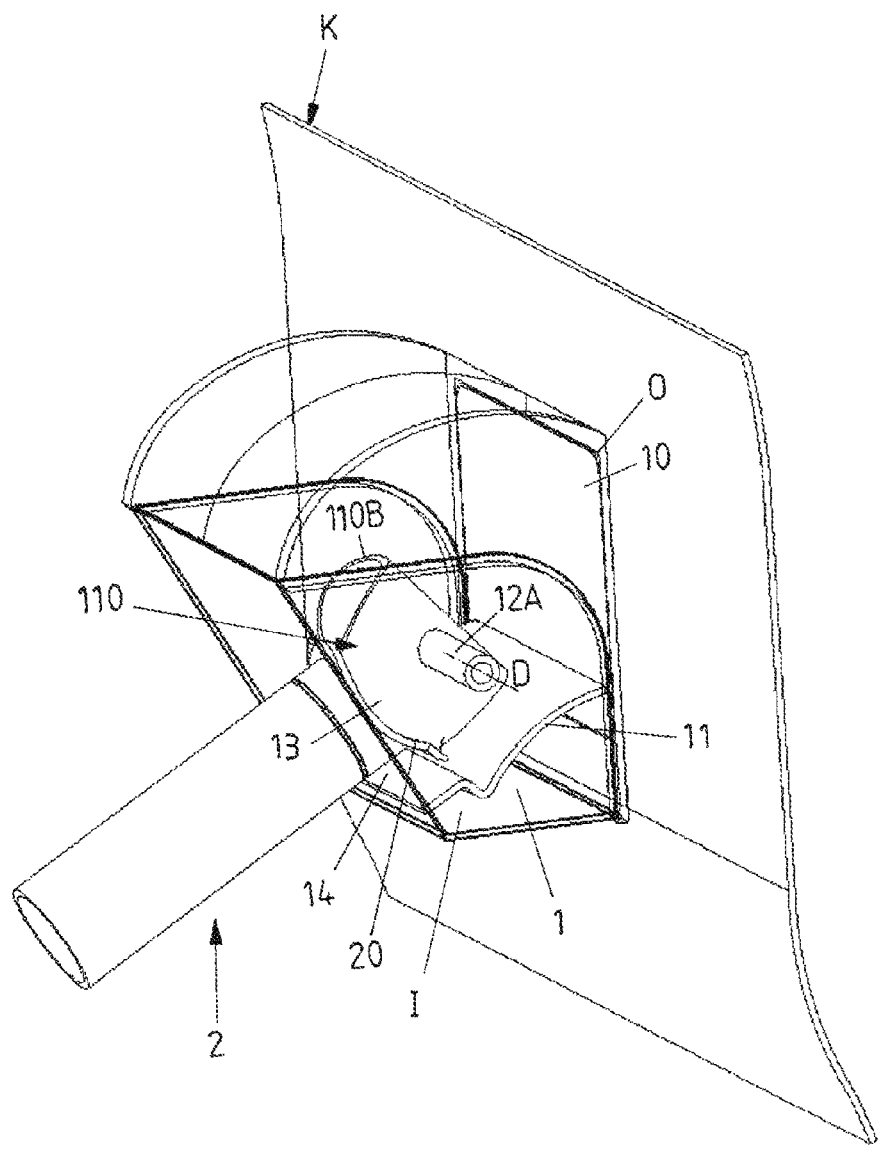
FIGS. 3A-3B show the closure device with a view from the inside and in different positions of the filler cap.
Figure 3B:
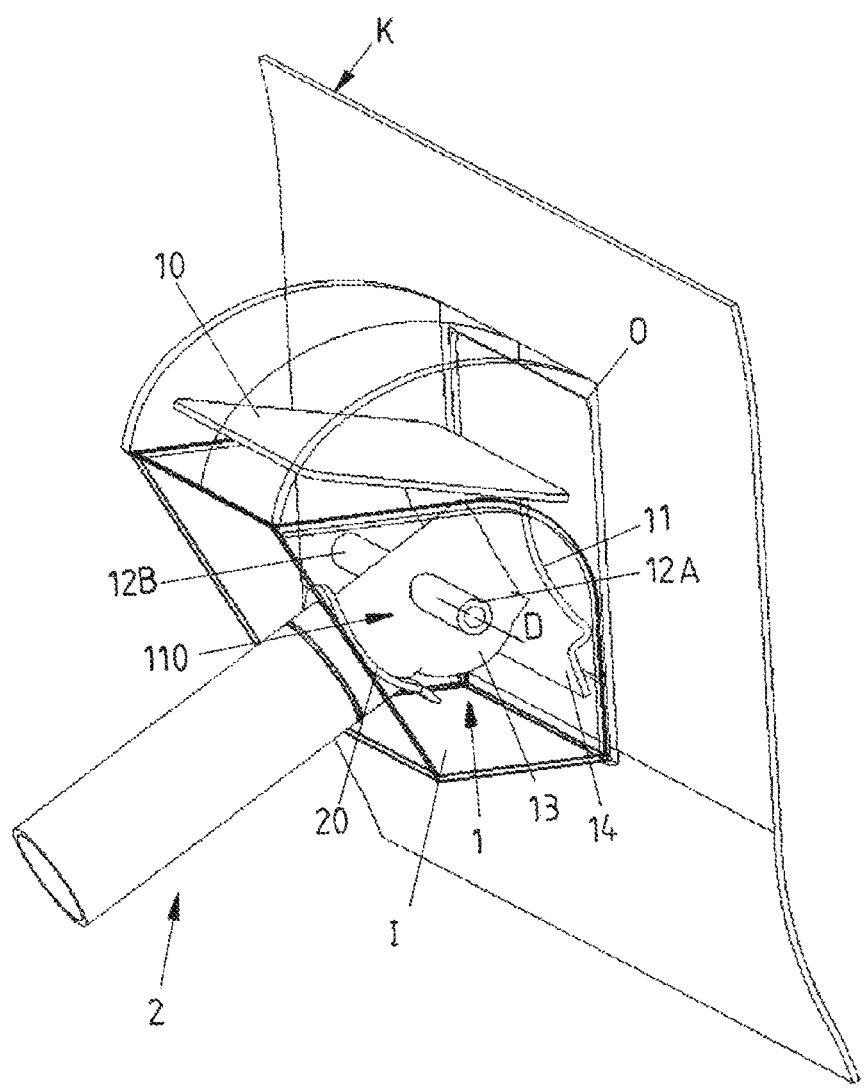
Figure 4A:
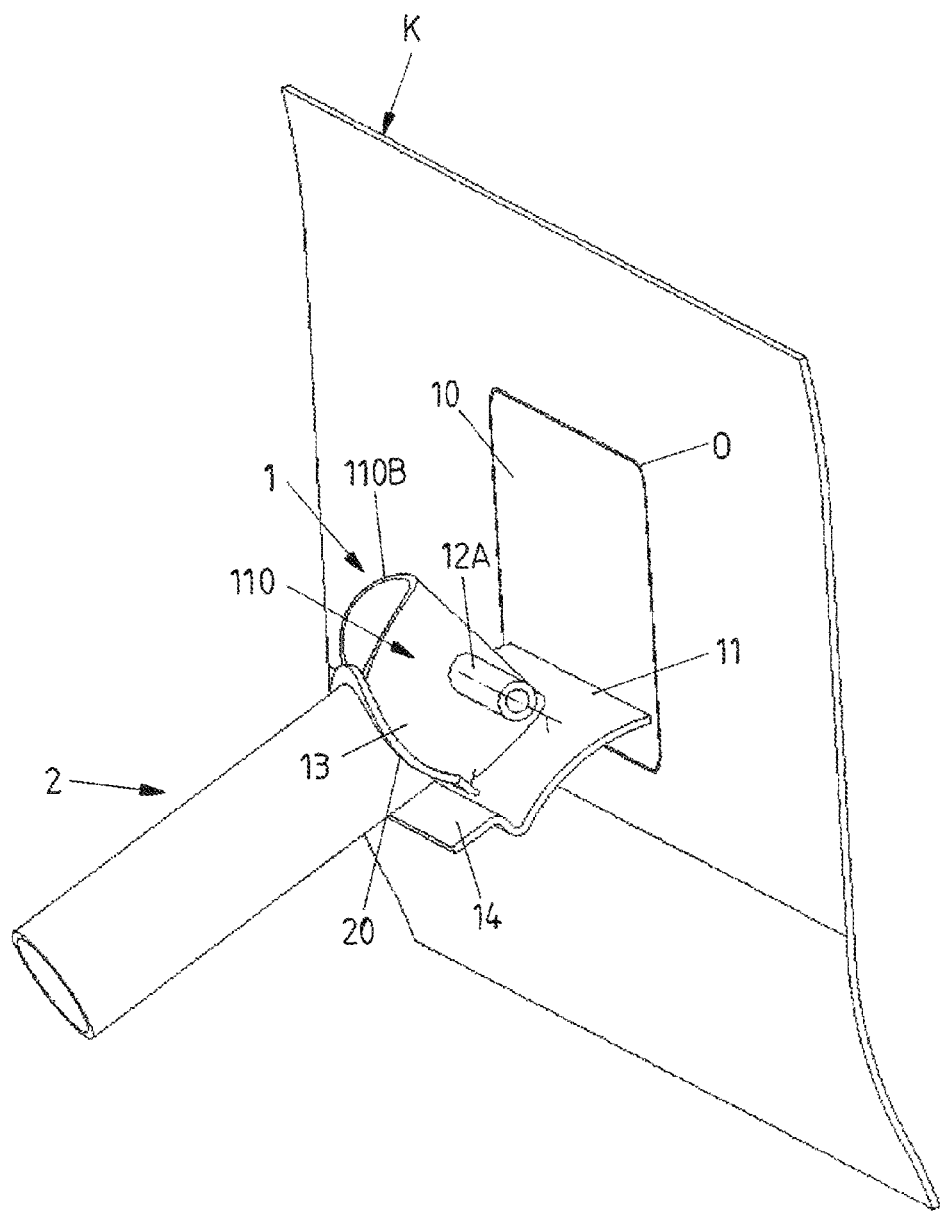
FIGS. 4A-4B show the closure device in views which coincide with FIGS. 3A and 3B, without an illustration of the interior space, in which the filler cap is mounted adjustably.
Figure 4B:
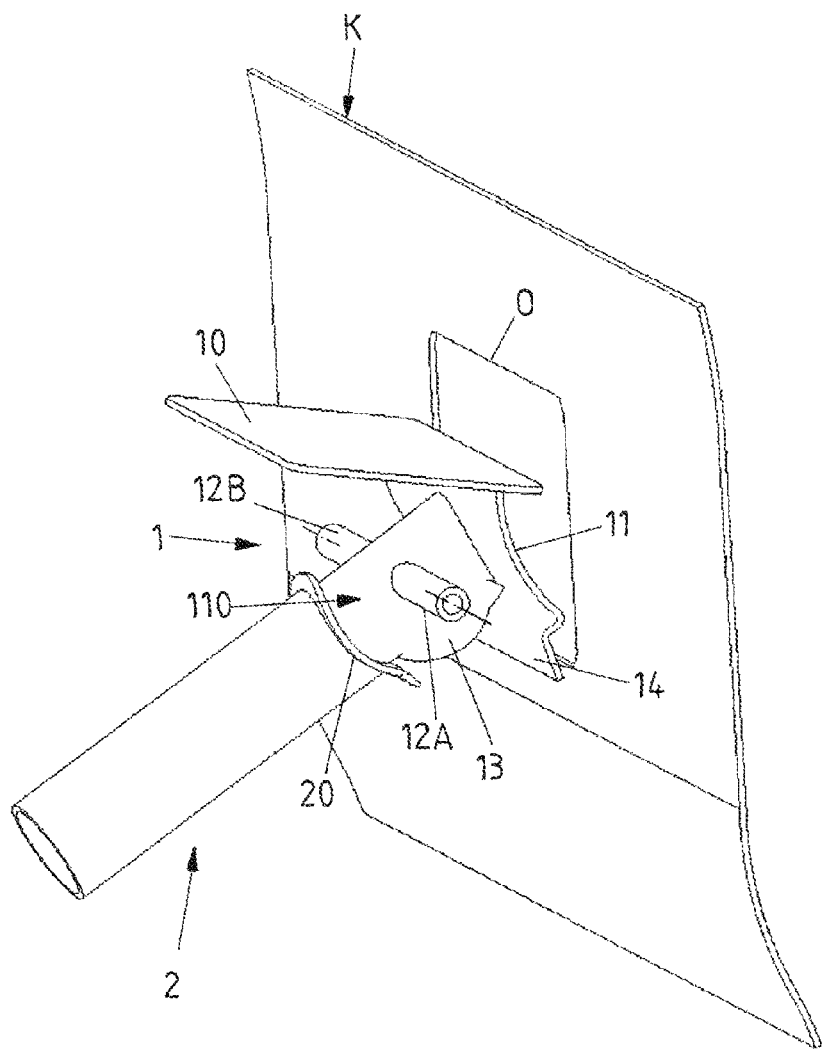
Figure 5A:
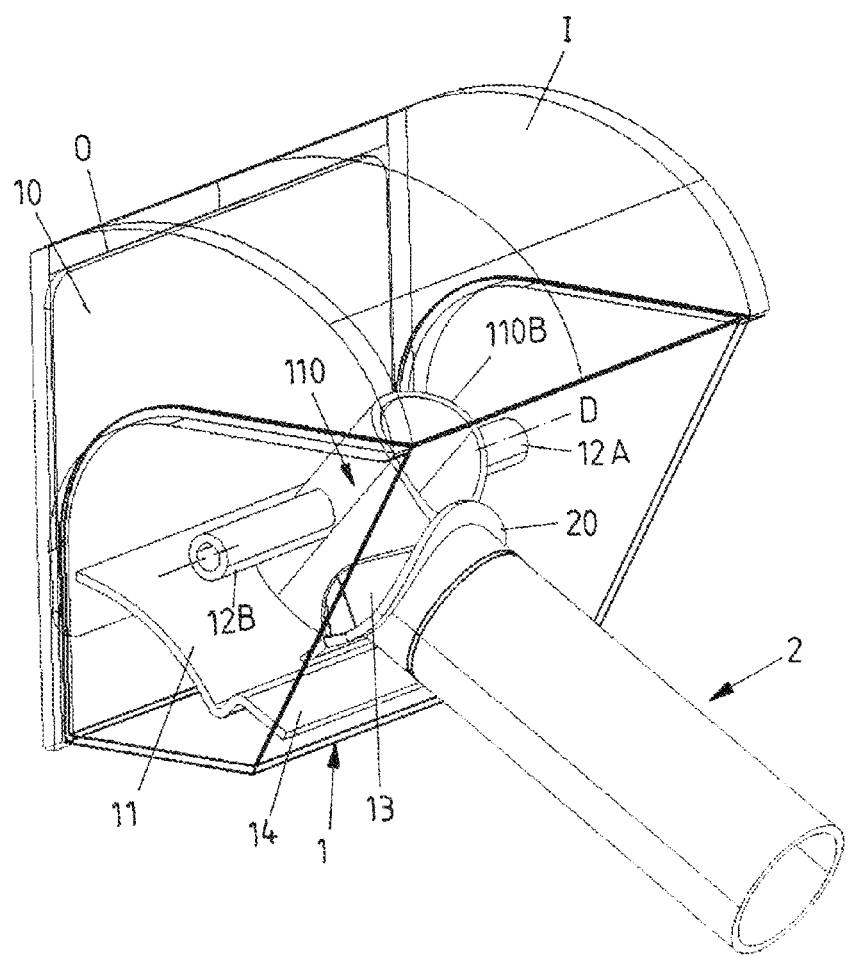
FIGS. 5A-5B show a further view of the closure device with a view from the inside.
Figure 5B:
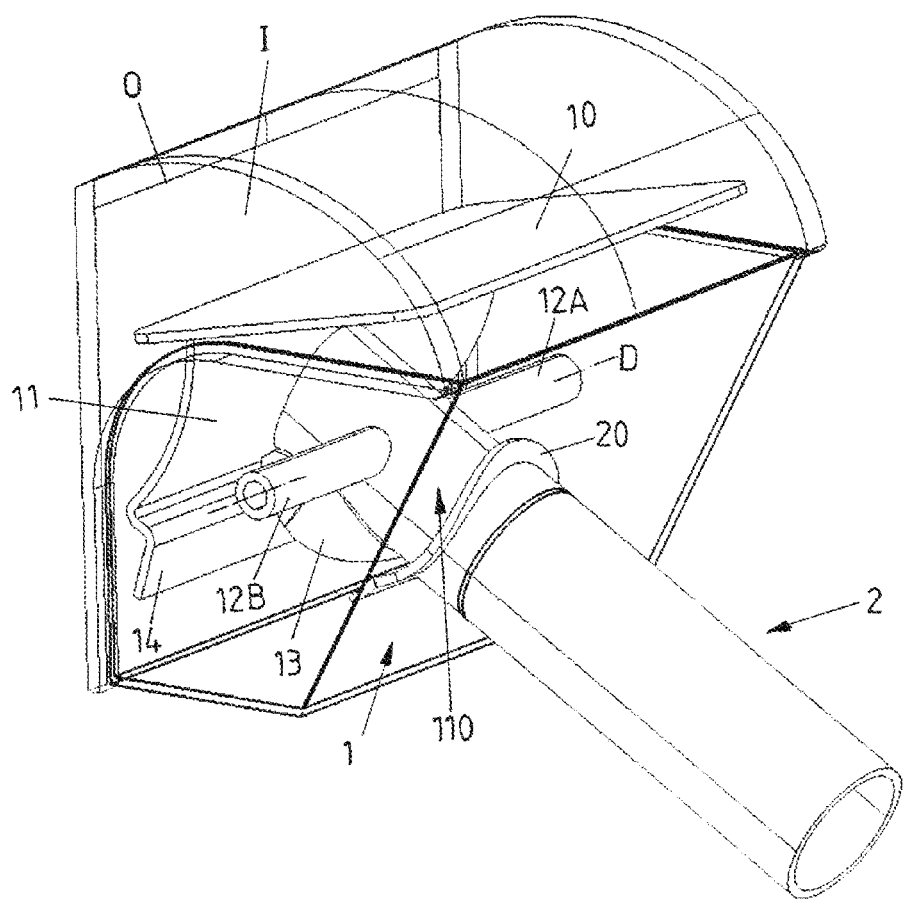
Figure 6A:
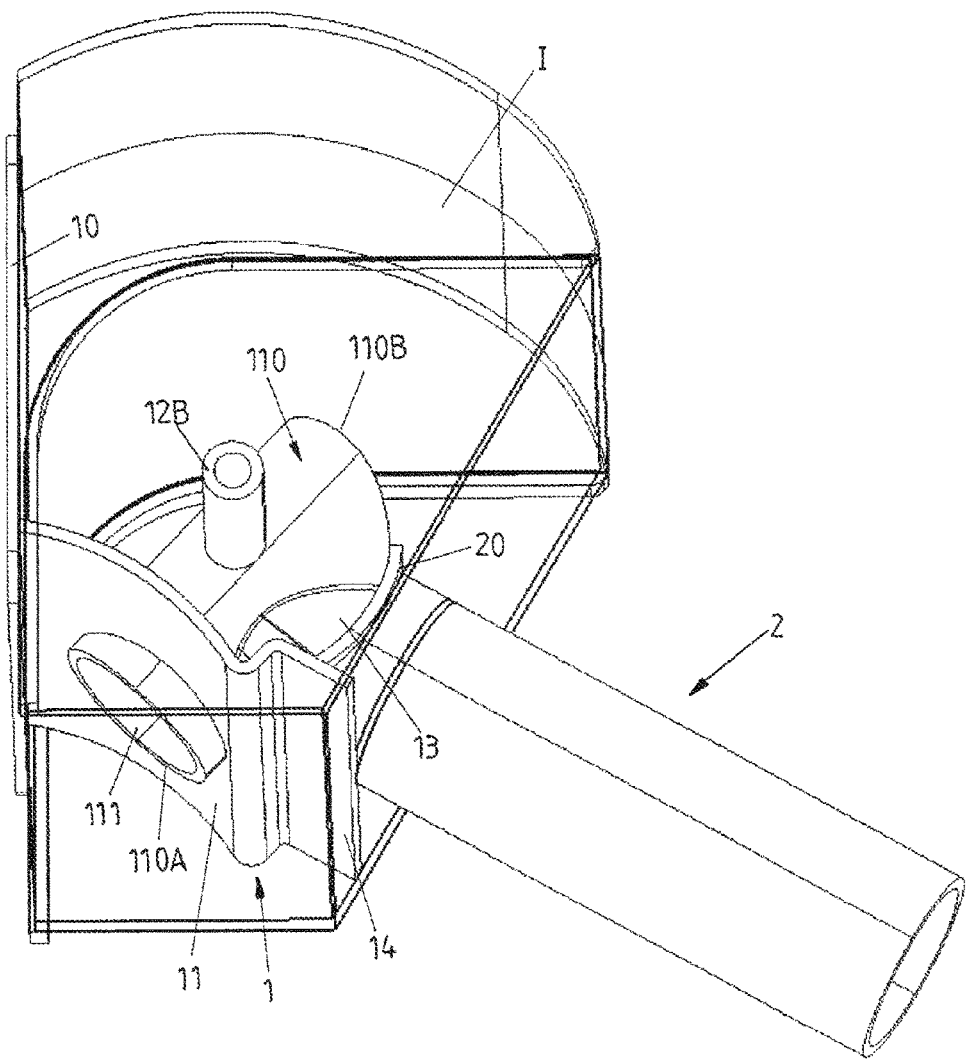
FIGS. 6A-6B show additional views of the closure device in the different positions of the filler cap.
Figure 6B:
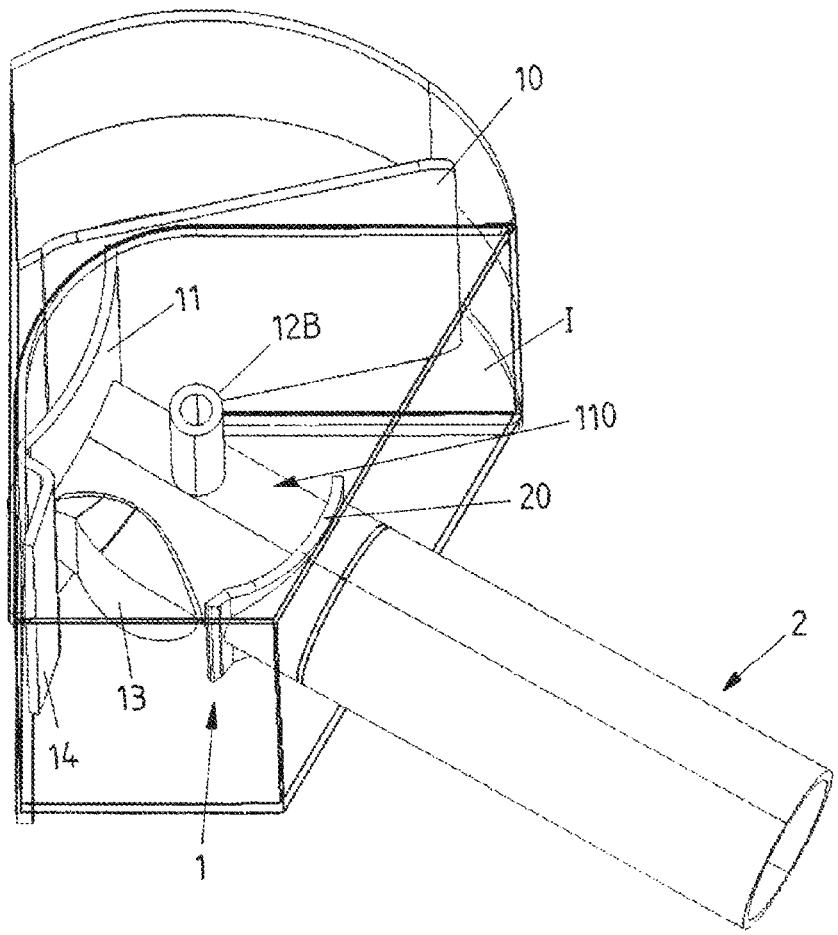

FIGS. 1A-6B, 7A-7D, 8A-8C, 9A-9C, 10A-10D, 11A-11B and 12A-12B show different design variants of closure devices according to the invention, in the case of which a cover element in the form of a filler cap 1 is mounted rotatably, with the result that the filler cap 1 can be pivoted between a closure position for closing a through opening O on the outer skin of a vehicle body K and an open position for opening said through opening O. Here, each filler cap 1 forms a covering section 10, via which the through opening O is at least partially closed as intended. Moreover, each filler cap 1 forms at least one closure section 13 for (sealingly) closing a filling opening of a filler neck 20 and/or a connecting section 110 with a connecting channel 111 for filling fuel.

FIGS. 1A-6B show a first exemplary embodiment of a closure device according to the invention with a pivotable filler cap 1 which forms both a closure section 13 and a connecting section 110. Here, the figures which are denoted by "A" show the filler cap 1 in each case in its closure position, whereas the figures which are denoted by "B" show the filler cap 1 in its open position in a consistent view.

The filler cap 1 has a plate-shaped closure section 10, via which the opening O in the body K is completely closed when the filler cap 1 is situated in a closure position. It goes without saying here that the closure section 10 can also have a different geometry than the one shown here and can have, for example, a circular base area. The filler cap 1 is mounted such that it can be rotated within an interior space I about a rotational axis D, with the result that the closure section 10 can be pivoted out of a closed position, in which it (virtually) completely fills the through opening O, into the interior space I into an open position.

Cylindrical bearing sections 12A and 12B are configured on the filler cap 1 for the rotatable mounting. Sliding mounting can be realized via said bearing sections 12A and 12B, by the latter being, for example, of hollow-cylindrical configuration and in each case being pushed over a bearing journal, or by said cylindrical bearing sections 12A and 12B in each case being mounted slidingly in a bearing bush.

In its closure position, the filler cap 1 sealingly closes a filling opening of a filler neck 20 via a closure section 13 in the interior of the interior space I. Here, the filler neck 20 forms the end of a filler tube 2, via which fuel can be filled into a fuel tank of the vehicle. The closure section 13 of the filler cap 1 is adapted to the geometry of the filling opening on the filler neck 20, with the result that, in the closure position of the filler cap 1, the closure section 13 bears sealingly against a sealing face which is defined by the edge of the filling opening. In the present case, the filler neck 20 is of concavely curved configuration on its end face which faces the filler cap 1. Here, the closure section 13 which is configured on the filler cap 1 is convexly curved correspondingly. In the present case, furthermore, the end face of the filler neck 20, against which the closure section 13 bears in the closure position of the filler cap 1, is arranged at an angle with respect to the through opening O. The concave curvature of the end face of the filler neck 20 and the convex curvature of the closure section 13 of the filler cap 1 in each case run along a circular path about the rotational axis D, with the result that the closure section 13 can be displaced relative to the filler neck 20 without problems, in order to open the filling opening.

In order to open the filling opening and the through opening O, the filler cap 1 is adjusted in a rotational direction about the rotational axis D, as a result of which the plate-shaped covering section 10 is pivoted into the interior of the interior space I. Here, the adjustment of the filler cap 1 takes place via an adjusting mechanism which is actuated by external force and by way of which, for example at a bearing section 12A or 12B, a torque which is generated by a drive motor is applied in order to adjust the filler cap 1. Here, the adjustment is triggered in a contactless manner, in particular via a, for example, capacitive proximity sensor, by way of the detection of gestures of a user or the detection of a certain object, such as a pump nozzle or a charging plug. Proximity sensors for contactless triggering of an adjusting movement of an adjusting part on a motor vehicle are widely known, for example in conjunction with the automated adjustment of a vehicle side door, a tailgate or a trunk lid. In addition, a mechanical triggering means can be provided, in order to pivot the filler cap 1 in a manner which is actuated by external force.

If the filler cap 1 is pivoted into an open position, in which the covering section 10 no longer covers the through opening O, a functional section 11 of the filler cap 1 with a viewing area faces the through opening O. The edge of a channel end 110A of a connecting channel 111 projects in the manner of a collar on said flat functional section 11. The connecting channel is circular-cylindrical in the exemplary embodiment which is shown. Here, the circular-cylindrical connecting channel 111 is configured by way of a connecting section 110 of the filler cap 1. Whereas the one channel end 110A is accessible at the through opening O, with the result that a pump nozzle can be introduced here, for example, a connection to the filler neck 20 of the filler tube 2 is established via the other channel end 110B which lies in the interior space I. In this way, the filler cap 1 defines an extension or connecting stub for the filler tube 2 by way of its connecting section 110 to the connecting channel 111, with the result that fuel can be refilled via said extension or connecting stub in the open position of the filler cap 1, and the filling opening of the filler neck 20 is accessible. Since the channel end 110A lies in the region of the through opening O and is therefore readily accessible on the body K for a user, the refilling of fuel is facilitated as a result.

In the present case, the functional section 11 which faces the through opening O in the open position of the filler cap 1 is additionally curved concavely. This can achieve a situation, for example, where liquids flow away more easily from the functional section 11. Thus, the end-side viewing face of the functional section 11 is inclined with respect to the vertical in the open position of the filler cap 1, with the result that any dirty water or rain water or fuel residues can flow away in the direction of the through opening O as a result of its concave curvature.

Furthermore, a transversely running strip section 14 is provided on the filler cap 1 on a lower region of the functional section 11, below the curved viewing face. Said strip section 14 can be configured for protection against contaminants and/or for avoiding undesired or unimpeded access into the interior space I. If the filler cap 1 is present in its open position, the strip section 14 can avoid a situation where a user reaches past the filler cap 1 below the functional section 11 into the interior space I. In addition, the strip section 14 makes it more difficult for dirt to penetrate into the interior space I below the functional section 11.

The interior space I can be formed within the body K by way of a corresponding shape. As an alternative, the interior space can be formed by way of a separate housing of the closure device, which housing is fastened on the inside to the body K. In the embodiment which is shown, it is decisive merely that the filler cap 1 which integrates different functions via its covering section 10, its connecting section 110 and its closure section 13 is mounted rotatably within said interior space I here. In this way, the filler cap 1 assumes not only the function of a conventional filler cap or a conventional filler flap, but rather also the function of a closure for the filler neck 20, and provides a connecting channel with a dedicated filler opening which opens into the filling opening of the filler neck 20. Rather, it is also avoided in the case of a closure device with a filler cap 1 of this type that parts of the closure device project on the body F, to be precise independently of whether the filler cap is open or closed.

Although this is not shown in detail in FIGS. 1A-6A, an adjusting mechanism which is actuated by external force for adjusting the filler cap 1 is provided, in order for it to be possible to adjust said filler cap 1, for example, via an electric motor drive and in an automated manner, for example with the aid of at least one proximity sensor.

It can be provided in one development that the filler cap 1 is configured in multiple pieces, and a separate screen 100 is fastened to the covering section 10 as one of at least two parts (cf. also the exemplary embodiments explained in the following text of FIGS. 8A-8C, 9A-9C, 10A-10D, 11A-11B and 12A-12B). Here, the screen 100 can be manufactured in a disk-shaped manner and/or from a relatively high quality material, in order to form an outer surface which is esthetically pleasant and is adapted to the outer skin of the vehicle, without manufacturing the entire filler cap 1 from a relatively high quality material.

A cavity H, in which a proximity sensor or at least parts thereof are accommodated in a protected manner, can also be provided between a screen 100 and a covering section 10, to which the screen is fastened. In this way, a proximity sensor can be arranged on the covering section 10 or the screen 100, for example, during the assembly of a multiple-piece cover element, before the fastening of the screen 100 then takes place and the proximity sensor is covered by way of the screen 100. Although it can be advantageous here, in particular for the support and fastening of the screen 100, if the covering section 10 is of plate-shaped configuration, as shown in the appended figures, or has a planar end face which faces the through opening, this is not mandatory.

FIGS. 7A-7D illustrate by way of example possible variants for the arrangement of two different sensor devices S1, S2 and S1*, S2* on a filler cap 1 of the adjusting device of FIGS. 1A-6B. Here, a first sensor device S1 or S1* is provided for detecting an operating event for opening the filler cap 1, and a second sensor device S2 or S2* which is spaced apart spatially herefrom is provided for detecting an operating event for closing the filler cap 1. For this purpose, sensor elements of the first sensor device S1 or S1* are arranged on the covering section 10, whereas sensor elements of the second sensor device S2 or S2* are arranged on the functional section 11 and/or the strip section 14 of the filler cap 1. Here, at least the parts of a first or second sensor device S1, S1* or S2, S2* are arranged on a section 10 or 11, 14 which lies in the through opening O in the closure position or in the open position of the filler cap 1 and defines a monitoring region for contactless detection of an operating event and/or a sensor area for an operating event which can be detected by way of contact of the sensor area.

In the case of the design variant of FIG. 7A, two elongate sensor fields or sensor electrodes S1A and S1B are provided on the covering section 10 as part of the first sensor device S1, in order to detect an operating event for opening the filler cap 1 when the filler cap 1 is closed. Here, the two sensor fields or electrodes S1A, S1B run in each case substantially parallel to the rotational axis D via a part of the covering section 10, and allow, for example, the approach of a hand or a defined gesture of a user, for example a wiping movement, to be detected in a contactless manner, in order to activate the drive of the filler cap 1 in order to open it. For example, the change in an electromagnetic field which is generated by way of the sensor electrodes S1A, S1B and/or in an electric capacitance which can be evaluated via the latter is detected for contactless detection of an operating event. As an alternative, a contact sensor can be defined via the sensor fields S1A and S1B, via which contact sensor it can be detected whether a user touches the covering section 10 with his/her hand, with the result that the filler cap is opened as a consequence of said contact.

In an analogous manner, sensor fields or sensor electrodes S2A and S2B are provided so as to run parallel to one another on the strip section 14 below the functional section 11, in order, as part of the second sensor device S2 when the filler cap 1 is open, to detect an operating event for closing the filler cap 1 and to correspondingly actuate the drive.

Figure 7B:
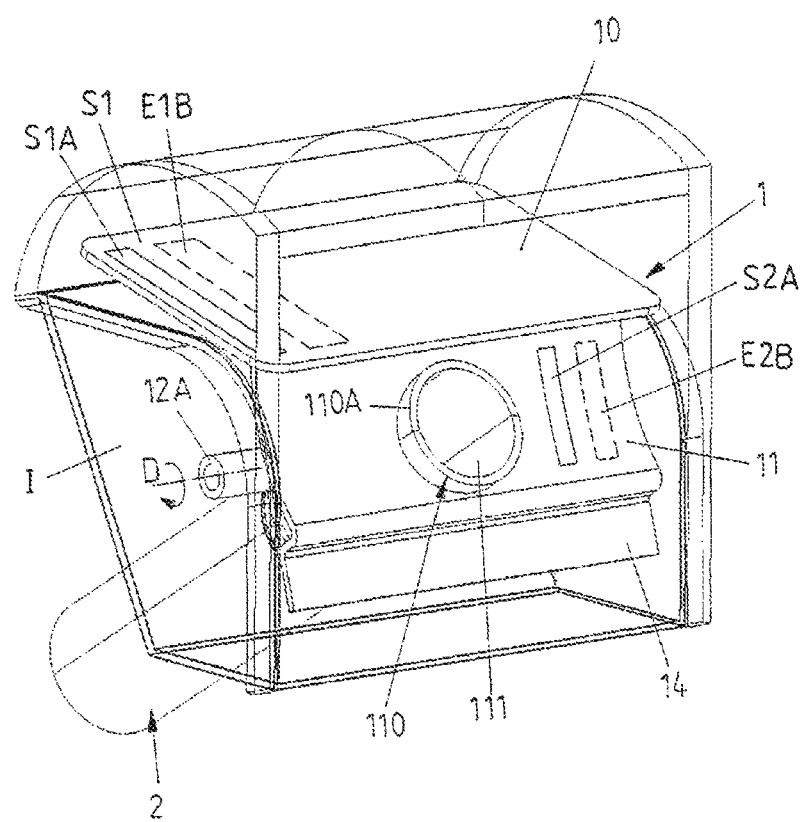
Figure 8B:
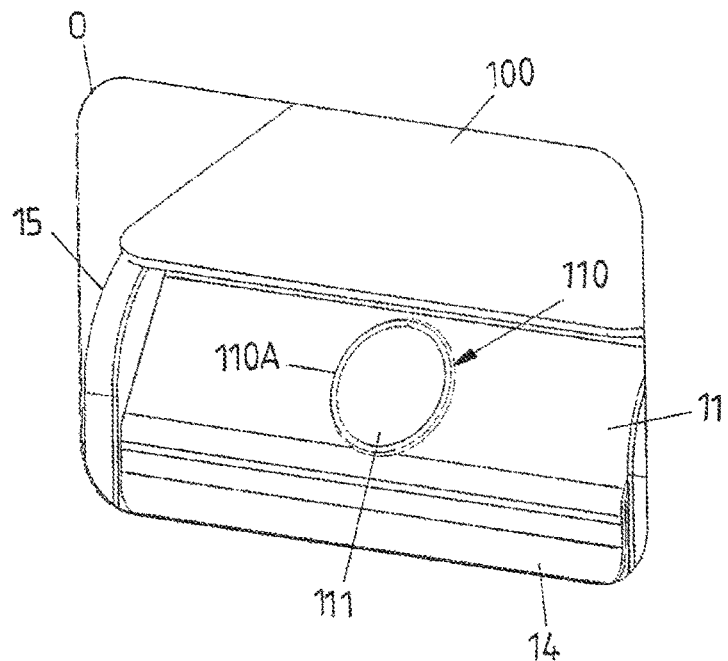
Figure 8C:
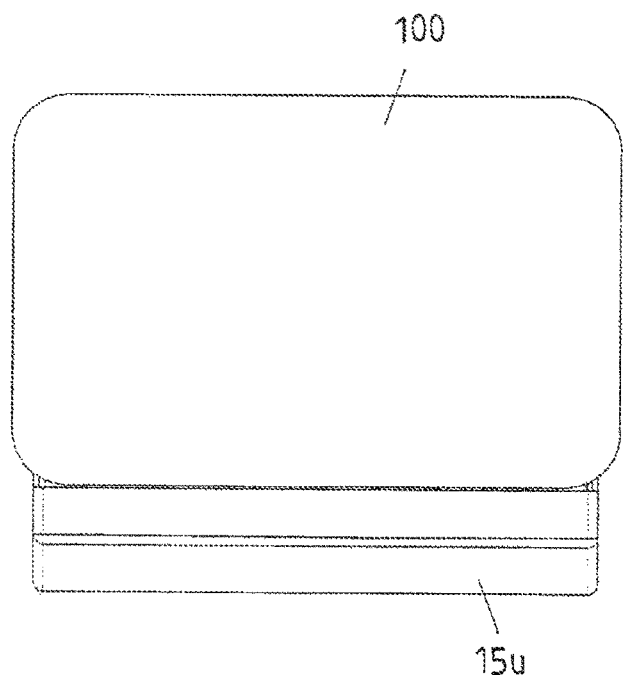

In the design variant of FIG. 7B, the two sensor devices S1 and S2 which are spaced apart spatially from one another in each case have a transmitting electrode S1A or S2A and a receiving electrode E1B or E2B, in order to capacitively detect an operating event, such as a defined gesture, for opening or closing the filler cap 1 in a contactless manner. Here, an electrode pair S1A, E1B or S2A, E2B is provided in each case on an edge region of the covering section 10 or the functional section 11. Here, the respective electrodes of an electrode pair S1A, E1B or S2A, E2B in each case run parallel to one another and substantially perpendicularly with respect to the rotational axis D. In addition, the two electrode pairs S1A, E1B and S2A, E2B are arranged offset with respect to one another on the filler cap 1 in relation to the rotational axis D, with the result that the electrodes S1A, E1B of the first sensor device S1 are arranged on the covering section 10 on the left in relation to the channel end 110A, and the electrodes S2A, E2B of the second sensor device S2 are arranged on the functional section 11 to the right thereof. As a result, mutual influencing of the electrode pairs S1A, E1B or S2A, E2B can be ruled out more easily.

In the design variant of FIG. 7C, capacitively operating sensor devices S1 and S2 are likewise provided. Here, a single transmitting electrode S is provided for the definition of the respective proximity sensors. Said sensor electrode S interacts both with a receiving electrode E1A of the first sensor device S1 on the covering section 10 and with a further receiving electrode E2A of the second sensor device S2 on the functional section 11, in order to detect an operating event in the respective area around the receiving electrode E1A or E2A in the case of a closed or open filler cap 1. The single sensor electrode S therefore runs partially both on the covering section 10 and on the functional section 11 of the filler cap 1.

In the design variant of FIG. 7D, in each case one (here, circular) sensor surface on the covering section and the functional section 11 is defined and monitored for contact by a user via two sensor devices S1* and S2*. Here, the contact of the corresponding sensor surface on the surface of the filler cap 1 by a user is detectable by way of the sensor devices S1* and S2*, as a result of which opening or closing of the filler cap 1 is then triggered. In order to make the sensor surfaces visible on the filler cap 1 for a user, markings, for example in the form of (color) symbols and/or relief-like contours, are provided in each case at the corresponding locations on the covering section and the functional section 11. It goes without saying that a haptically operating sensor system in accordance with the exemplary embodiment of FIG. 7D can also be combined with a sensor system for contactless detection of an operating event. For example, opening of the filler cap 1 can be controlled in a contactless manner via a gesture of the user, whereas contact or even pressing of the corresponding sensor surface on the filler cap 1 is necessary for closing the filler cap 1.

FIGS. 8A-8C, 9A-9C and 10A-10D illustrate a second exemplary embodiment of a closure device according to the invention.

In contrast to the above-described design variants, a module housing in the form of a housing frame 15 is provided in said exemplary embodiment, on which module housing the filler cap 1 is not only mounted pivotably, but rather its drive A is also fastened. The filler cap 1 can therefore be pre-mounted on the housing frame 15 together with its drive A and can be inserted as a module into a body opening, in the interior space I of which the filler neck 20 is arranged. For this purpose, a plurality of fastening points BS are provided on the housing frame 15, both on an upper and on a lower housing frame section 15o and 15u.

In addition, the exemplary embodiment of FIGS. 8A-8C, 9A-9C and 10A-10D has a screen 100 on the covering section 10. The screen 100 is fastened to the covering section 10 and in the present case closes the through opening O completely when the filler cap 1 is present in its closure position. The screen 100 can be manufactured from a relatively high quality and, for example, metallic material or a plastic material and/or can be fastened replaceably on the covering section 10, in order for it to be possible to exchange it easily and adapt it to customer wishes. In order to make the filler neck 20 accessible via the connecting channel 111 of the filler cap 1, the covering section 10 with the screen 100 fastened thereto can be moved along the upper housing frame section 15o during opening of the filler cap 1, with the result that the screen 100 is also present for the greatest part or completely in the interior of the interior space I when the filler cap 1 is open.

Figure 9C:
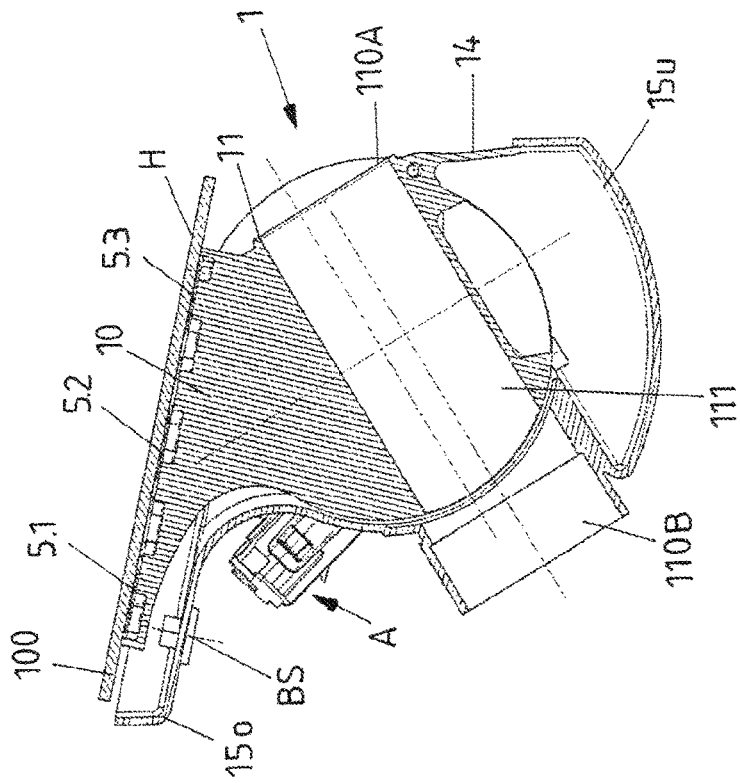
Figure 9B:
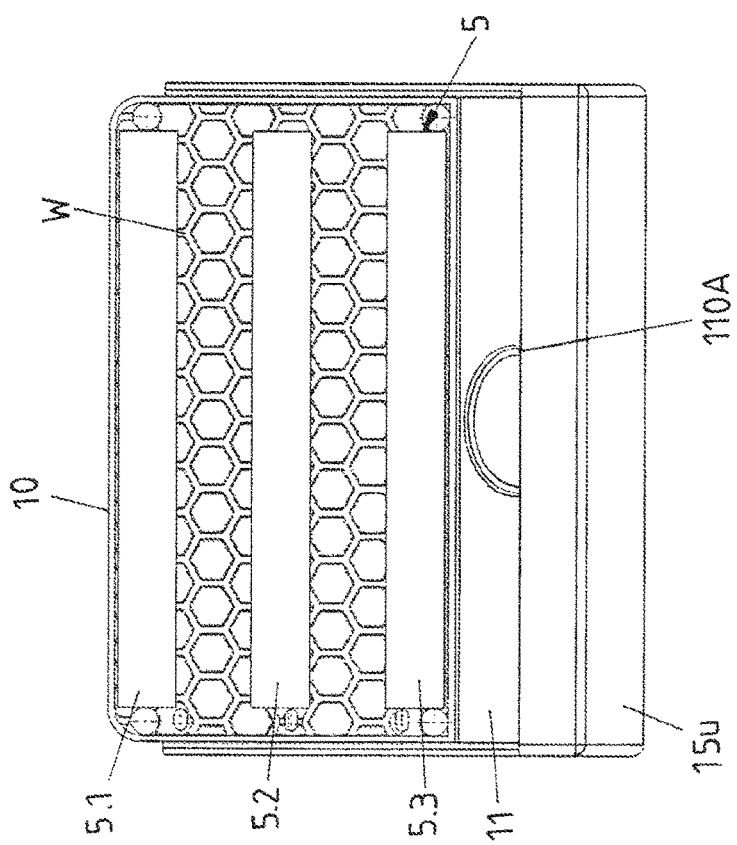

As can be seen, in particular, from FIGS. 9A, 9B and 9C, the screen 100 closes a cavity H which is configured on the covering section 10. A honeycomb structure W is configured in said cavity H in order to stiffen the covering section 10 which is open on one side. Moreover, parts of a first sensor device 5 which serves to detect an operating event for opening the filler cap 1 are arranged in the cavity H. Thus, in the present case, a plurality of sensor electrodes 5.1, 5.2 and 5.3 of the first sensor device 5 are arranged among one another within the cavity H and are covered by the screen 100 when the latter is fixed on the covering section 10 as intended. The individual sensor electrodes 5.1, 5.2, 5.3 are therefore situated within the covering section 10 and on the rear side of the screen 100 when the cavity H is closed by the latter as intended. Via the sensor electrodes 5.1, 5.2 and 5.3, a gesture of a user which is carried out in front of the screen 100 of the closed filler cap 1 can be capacitively detected without contact and can be evaluated by means of an evaluation logic means as an operating event for opening the filler cap 1.

Figure 10A:
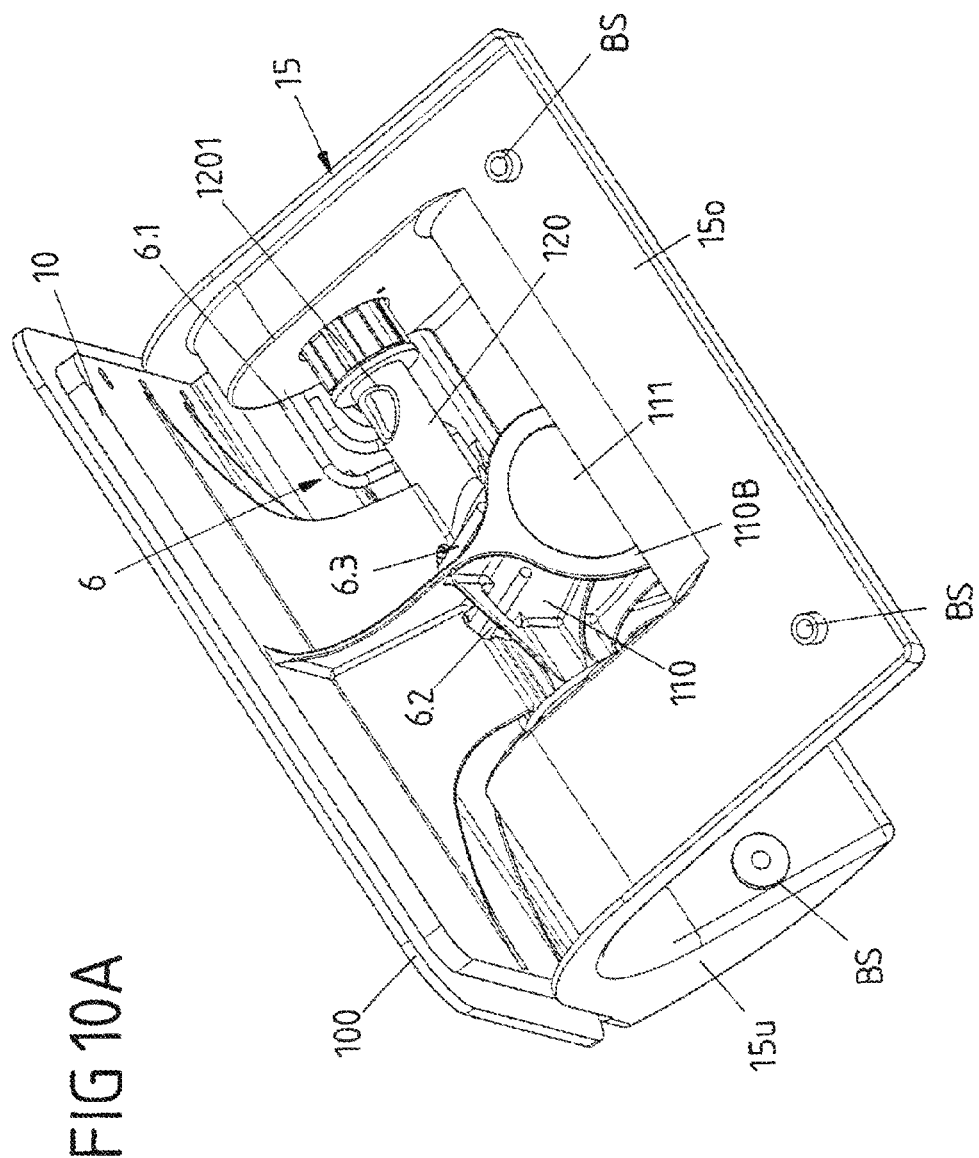

As illustrated in FIGS. 10A-10C, the closure device with the filler cap 1 has a second sensor device 6 in the region of the functional section 11 in addition to the first sensor device 5 in the region of the covering section 10. Said second sensor device 6 serves to detect an operating event for closing the filler cap 1. For this purpose, the second sensor device 6 likewise has at least two sensor electrodes, via which an operating event by way of a user can be detected capacitively in the region of the functional section 11, in order to close the open filler cap 1. Here, a plurality of spirally wound sensor electrode sections 6.1 of said sensor electrodes are provided on the rear side of the functional section 11. Via said sensor electrode sections 6.1, when the filler cap 1 is open, influencing of an electromagnetic field which is generated in the region of the functional section 11 by way of the hand of a user or an electric capacitance which is changed as a result can be detected. A conclusion is made herefrom as to the occurrence of an operating event for closing the filler cap 1, and the drive A of the filler cap 1 is actuated correspondingly. It goes without saying that contactless detection or sensing of one or more operating events for adjusting the filler cap 1 can in principle take place not only capacitively, but rather also inductively and/or optically.

Moreover, it can be detected by way of the second sensor device 6 (or, as an alternative, also via a third sensor device) whether a pump nozzle is plugged into the connecting channel 111 when the filler cap 1 is open. For this purpose, two sensor electrode sections 6.2 and 6.3 of the sensor electrodes of the second sensor device 6 are provided in the present case on the circumferential face of the connecting channel 111 and therefore on an outer face of the connecting section 110. Here, the sensor electrode sections 6.2 and 6.3 run substantially along the longitudinal axis of the connecting channel 111. It can be detected in a contactless manner via said sensor electrode sections 6.2 and 6.3 whether a pump nozzle is introduced into the connecting channel 111 or has been removed from the latter. Accordingly, closing of the filler cap 1 in a manner which is actuated by external force can be made dependent on whether a pump nozzle signal which indicates that the connecting channel 111 is free and therefore a pump nozzle is not/no longer plugged into the connecting channel 111 prevails at an evaluation logic means of the associated control electronics system or not. This can avoid a situation where the filler cap 1 is automatically closed although the pump nozzle (or another object which is introduced into the connecting channel 111 from the outside) is still introduced into the connecting channel 111.

Here, in one design variant, the closing of the filler cap 1 can already be triggered by the fact that, after plugging of a pump nozzle into the connecting channel 111 has previously been detected, the removal of the pump nozzle is detected. Since it is to be assumed that the fueling operation is concluded when the pump nozzle is removed, the filler cap 1 is then closed automatically. Here, closing can optionally also take place, however, only when a predefined time period has elapsed after the removal of the pump nozzle has been detected. Accordingly, the filler cap 1 is not closed immediately, but rather only a few seconds after the removal of the pump nozzle.

Although, in one design variant, closing of the filler cap 1 can also take place, moreover, in a manner which is dependent on a pump nozzle signal, with or without a time delay, the detection of a (further) operating event is additionally also necessary for the actuation of the drive A for closing the filler cap 1. As a consequence, the removal of the pump nozzle not only has to have been detected by sensor, but rather also, for example, a corresponding wiping gesture of a user in the region of the second sensor device 6 and/or the contact of a corresponding sensor surface, such as the sensor surface according to FIG. 7D which is defined by way of the second sensor device S2* on the functional section 11.

In order to lay electric lines for coupling the sensor devices 5 and 6 to a control electronics system and/or to a power supply in a space-saving, reliable and rattle-free manner along the closure device and, in particular, along the filler cap 1, a bearing pin 120 which is preferably formed on the filler cap 1 and extends along the rotational axis D is of at least partially hollow configuration in the design variant which is shown. The bearing pin 120 which is mounted rotatably on one side on the upper housing frame section 15o and is coupled on the other side to the electric motor drive A via a connecting region 1202 can therefore receive at least one line in its interior. Here, one or more lines can be routed out of the interior of the bearing pin 120 via a lateral line opening 1201 in the shell of the bearing pin 120, and are connected to the first sensor device 5 on the covering section 10 and/or the second sensor device 6 on the functional section 11. Here, the line opening 1201 on the bearing pin 120 can also be dimensioned so as to be so great that a line plug which is provided on the line can be guided through it.

In the present case, a plurality of reinforcing ribs which in each case open on the central connecting section 110 are likewise provided on the rear side of the covering section 10 for stiffening, as on the rear side of the functional section 11. As an alternative or in addition, at least one electric line for one of the sensor devices 5 or 6 can likewise be laid along said reinforcing ribs.

FIGS. 11A-11B and 12A-12B illustrate possible developments of the design variant of FIGS. 8A-8C, 9A-9C and 10A-10D, in which in each case one printed circuit board 50, on which the sensor electrodes 5.1, 5.1 and 5.3 are arranged, is likewise accommodated in the cavity H of the covering section 10. Here, each of the sensor electrodes 5.1, 5.2 and 5.3 is connected via a line 51, 52 or 53 to an electronic component 54 or 55 which is arranged on the rear side of the covering section 10. Here, each of the electronic components 54, is connected to the printed circuit board 50 and electrically via the respective lines 51, 52 and 53 to the sensor electrodes 5.1, 5.2 and 5.3. For example, the respective electronic component 54, 55 is plugged onto the printed circuit board 50, for example via press fit pins.

In the design variant of FIGS. 11A and 11B, the electronic component 54 is formed, for example, by way of a plug part. A line plug can be plugged onto said plug part, in order to connect the sensor electrodes 5.1, 5.2 and 5.3 to an external control electronics system and/or to a power supply.

In the design variant of FIGS. 12A and 12B, an electronic component 55 which carries, in particular, the evaluation logic means for the detection of an operating event is provided on the rear side of the covering section 10. In addition, the electronic component 55 which is arranged on the rear side of the covering section 10 and is connected to the printed circuit board 50 can also accommodate the control electronics system for actuating the drive A and the evaluation logic means for both sensor devices 5 and 6. Here, the connection to the second sensor device 6 can take place via at least one additional line.

A line which is routed through the line opening 1201 of the bearing pin 120 can be provided, for example, for the connection to the drive A and/or an electric power supply. As an alternative or in addition, electric lines for power supply or signal transmission can be injection molded into the filler cap 1 and/or can be vapor deposited onto its (plastic) material.

In one development, an illumination element and/or a display element can be provided on a filler cap 1.

Here, an illumination element comprises at least one lamp, for example an LED, in order to illuminate the filler cap 1 in its closure position and/or in its open position. In this way, for example in the case of an open filler cap, the channel end 110A can be illuminated for the introduction of the pump nozzle. A corresponding lamp or a plurality of lamps can be provided for this purpose, for example, on the functional section 11 or on the rear side of the covering section 10.

Furthermore, additional information can be provided visually to a user via a display element. Thus, for example, information about the filling level of the tank can be provided via said display element. In one exemplary embodiment, a display element can indicate whether a pump nozzle has been introduced into the connecting channel 111 and/or has been removed again therefrom correctly. A display element can also comprise a display, via which information is displayed on the filler cap 1, for example vehicle data, such as tire pressure or the type of fuel to be filled.

LIST OF DESIGNATIONS

1 Filler cap (cover element)
10 Covering section
100 Screen
11 Functional section
110 Connecting section
110A, 110B Channel end
111 Connecting channel
120 Bearing pin
1201 Line opening
1202 Connecting region
12A, 12B Bearing section
13 Closure section
14 Strip section
15 Housing
15o, 15u Housing section
2 Filler tube
20 Filler neck
5 First sensor device
5.1, 5.2, 5.3 Sensor electrode
50 Printed circuit board
51-53 Line
54, 55 Plug part/control electronics system with evaluation logic means
6 Second sensor device
6.1, 6.2, 6.3 Sensor electrode (section)
A Drive
BS Fastening point
D Rotational axis
E, E1A, E2A, Receiving electrode (sensor element)
E1B, E2B
H Cavity
I Interior space
K Vehicle body
O Through opening
S Transmitting electrode (sensor element)
S1, S1* First sensor device
S1A, S1B, S2A, Sensor field/sensor electrode
S2B (sensor element)
S2, S2* Second sensor device
V Adjusting direction
W Honeycomb structure

The invention claimed is:

1. A closure device for closing a through opening on a vehicle, an interior space with a filling or connection opening being accessible via the through opening, wherein the filling or connection opening is configured and provided for consumable filling on the vehicle, the closure device comprising a cover element such that is possible for the through opening to be closed by way of the cover element which can be adjusted on the vehicle in a manner which is actuated by external force between at least one closure position for closing the through opening and an open position for opening the through opening, and a control electronics system for triggering an adjustment of the cover element being provided with at least one sensor device, wherein at least one first and second sensor device are provided, it being possible for an operating event for opening the cover element to be detected via the first sensor device, and it being possible for an operating event for closing the cover element to be detected via a second sensor device which is spaced apart spatially from the first sensor device, and the first sensor device being provided at least in parts on a covering section of the cover element, which covering section closes the through opening at least partially in the closure position, and the second sensor device being provided at least in parts on a section of the cover element, which section is different than said covering section and faces the through opening in the open position.

2. The closure device as claimed in claim 1, wherein both sensor devices are provided completely on the cover element.

3. The closure device as claimed in claim 1, wherein at least one sensor device of the closure device comprises at least one proximity sensor, by means of which an adjustment of the cover element which is actuated by external force can be triggered by a user in a contactless manner.

4. The closure device as claimed in claim 3, wherein at least one sensor device of the closure device comprises at least one contact sensor, by means of which an adjustment of the cover element which is actuated by external force can be triggered by a user via a touching of a sensor surface.

5. The closure device as claimed in claim 1, wherein the cover element is configured in multiple pieces and has a screen which lies on the outside and is fastened to the covering section of the cover element.

6. A closure device as claimed in claim 1, wherein the cover element has a screen which lies on the outside and is fastened to a covering section of the cover element, which covering section closes the through opening at least partially in the closure position, and the sensor device is accommodated at least in parts in an intermediate space which is formed between the covering section and the screen, and/or in a cavity of the covering section and/or in a cavity of the screen.

7. The closure device as claimed in claim 5, wherein a cavity of the covering section, in which cavity the sensor device is accommodated at least in parts, is configured to be closed by the screen.

8. The closure device as claimed in claim 1, wherein a connecting channel is configured on the adjustable cover element, one end of said connecting channel being accessible at the through opening, and a connection to the filling or connection opening being established at the other end of said connecting channel when the cover element is situated in its open position.

9. The closure device as claimed in claim 8, wherein the closure device has a sensor device, via which it can be detected whether an object is situated in the connecting channel.

10. The closure device as claimed in claim 9, wherein the sensor device for detecting an object in the connecting channel has at least one sensor electrode on a circumferential face of the connecting channel.

11. The closure device as claimed in claim 8, wherein the control electronics system has an evaluation logic means which triggers closing of the cover element only when it has been detected that no object is situated in the connecting channel.

12. The closure device as claimed in claim 11, wherein the control electronics system has an evaluation logic means which triggers closing of the cover element only when it has been detected that an object has no longer been situated in the connecting channel for a predetermined time period.

13. The closure device as claimed in claim 11, wherein the control electronics system has an evaluation logic means which triggers closing of the cover element only when it has been detected that no object is situated in the connecting channel and an additional operating event has been detected.

14. The closure device as claimed in claim 1, wherein at least one electric line for a sensor device is embedded at least partially into the material of the cover element.

15. The closure device as claimed in claim 1, wherein the cover element is mounted rotatably via a bearing pin, and at least one electric line for a sensor device is routed at least partially in a hollow bearing pin section within the bearing pin.

16. The closure device as claimed in claim 15, wherein a line opening is provided on the bearing pin, via which line opening an electric line can be routed out of the interior of the hollow bearing pin section, and the line opening is dimensioned in such a way that a line plug which is provided on the electric line can be guided through the line opening.

17. The closure device as claimed in claim 1, wherein the control electronics system is provided on the cover element.

18. The closure device as claimed in claim 1, wherein a liquid reservoir can be filled via a filling opening.

19. The closure device as claimed in claim 1, wherein a connection opening is provided for connection to a charging station.

20. The closure device as claimed in claim 17, wherein the control electronics system is integrated onto said cover element.

21. The closure device as claimed in claim 18, wherein the liquid reservoir is one of a wiper water reservoir, a cooling liquid reservoir, an oil reservoir and a fuel tank.

* * * * *

UNITED STATES PATENT AND TRADEMARK OFFICE
CERTIFICATE OF CORRECTION

PATENT NO. : 10,052,947 B2
APPLICATION NO. : 15/116177
DATED : August 21, 2018
INVENTOR(S) : Christian Herrmann et al.

It is certified that error appears in the above-identified patent and that said Letters Patent is hereby corrected as shown below:

In the Claims
Column 20, Line 13, Claim 1     After "that", insert -- it --

Signed and Sealed this
Tenth Day of September, 2019

Andrei Iancu
*Director of the United States Patent and Trademark Office*